(12) United States Patent
Shigemitsu et al.

(10) Patent No.: US 11,846,873 B2
(45) Date of Patent: Dec. 19, 2023

(54) APERTURE STOP FOR CAMERA WITH FOLDED OPTICS

(71) Applicant: Apple Inc., Cupertino, CA (US)

(72) Inventors: Norimichi Shigemitsu, Yokohama (JP); Hideki Tanaka, Yokohama (JP)

(73) Assignee: Apple Inc., Cupertino, CA (US)

(*) Notice: Subject to any disclaimer, the term of this patent is extended or adjusted under 35 U.S.C. 154(b) by 519 days.

(21) Appl. No.: 16/984,652

(22) Filed: Aug. 4, 2020

(65) Prior Publication Data

US 2021/0041765 A1 Feb. 11, 2021

Related U.S. Application Data

(60) Provisional application No. 62/883,545, filed on Aug. 6, 2019.

(51) Int. Cl.
| | |
|---|---|
| *G03B 17/04* | (2021.01) |
| *G02B 7/02* | (2021.01) |
| *H04N 5/33* | (2023.01) |
| *G02B 5/00* | (2006.01) |
| *G02B 13/00* | (2006.01) |

(52) U.S. Cl.
CPC ............ *G03B 17/04* (2013.01); *G02B 5/005* (2013.01); *G02B 7/023* (2013.01);
(Continued)

(58) Field of Classification Search
CPC .. G03B 17/04; G03B 2217/002; G02B 5/005; G02B 7/023; G02B 13/0065; H04N 5/33
(Continued)

(56) References Cited

U.S. PATENT DOCUMENTS

| 9,274,311 B2 | 3/2016 | Bone et al. |
| 2013/0163099 A1 | 6/2013 | Liphardt |
| (Continued) | | |

FOREIGN PATENT DOCUMENTS

| EP | 2083288 | 7/2009 |
| EP | 2083288 A1 | 7/2009 |
| (Continued) | | |

OTHER PUBLICATIONS

International Preliminary Report on Patentability from PCT/US2020/044952, dated Feb. 8, 2022, pp. 1-10.
(Continued)

*Primary Examiner* — William Choi
(74) *Attorney, Agent, or Firm* — Robert C. Kowert; Kowert, Hood, Munyon, Rankin & Goetzel, P.C.

(57) ABSTRACT

Various embodiments include an aperture stop for a camera with folded optics. In some examples, a folded optics arrangement of the camera may include one or more lens elements and one or more light path folding elements (e.g., a prism or a mirror). The aperture stop may be an elongated aperture stop. According to various examples, one or more prisms of the folded optics arrangement may have an elongated dimension in the same direction as an elongated dimension of the elongated aperture stop. In some embodiments, the aperture stop may be located between a prism and a lens group of the folded optics arrangement. In some embodiments, the aperture stop may be located proximate an optical element that optically powers a prism of the folded optics arrangement.

19 Claims, 14 Drawing Sheets

(52) U.S. Cl.
CPC ........... *G02B 13/0065* (2013.01); *H04N 5/33* (2013.01); *G03B 2217/002* (2013.01)

(58) Field of Classification Search
USPC .......................................... 359/726, 733, 739
See application file for complete search history.

(56) References Cited

U.S. PATENT DOCUMENTS

| | | | |
|---|---|---|---|
| 2014/0071247 A1* | 3/2014 | Imamura | H04N 13/225 |
| | | | 348/49 |
| 2016/0327773 A1 | 11/2016 | Choi et al. | |
| 2017/0031138 A1 | 2/2017 | Laroia | |
| 2018/0095260 A1* | 4/2018 | Cheng | G02B 21/0008 |
| 2019/0196148 A1 | 6/2019 | Yao et al. | |
| 2020/0150406 A1 | 5/2020 | Chen et al. | |

FOREIGN PATENT DOCUMENTS

| | | |
|---|---|---|
| JP | 2007148051 | 6/2007 |
| TW | 1659239 | 5/2019 |
| WO | 2018130898 | 7/2018 |
| WO | 2020068594 | 4/2020 |
| WO | 2020136144 | 7/2020 |

OTHER PUBLICATIONS

International Search Report and Written Opinion from PCT/US2020/044952, dated Oct. 20, 2020, pp. 1-17.

* cited by examiner

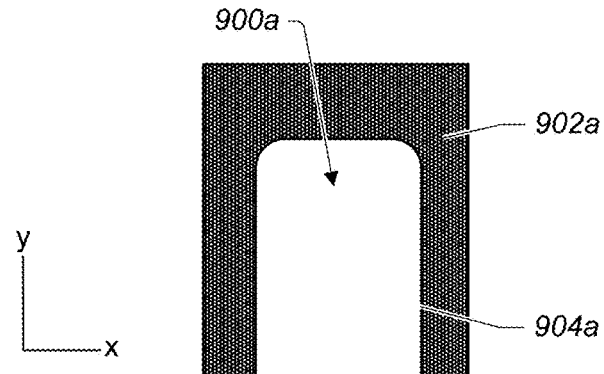
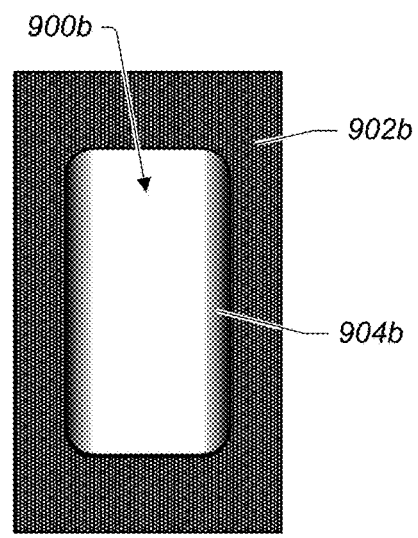
FIG. 9A    FIG. 9B
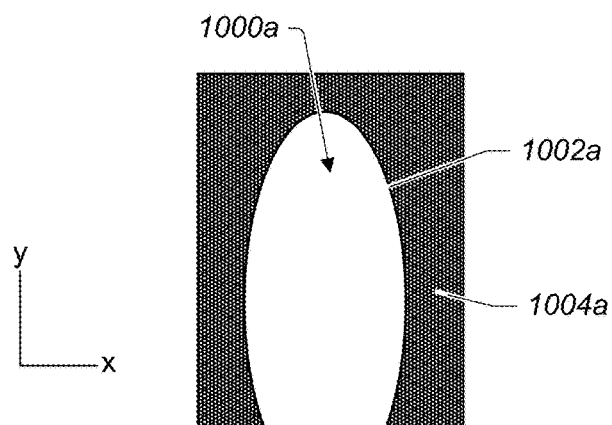
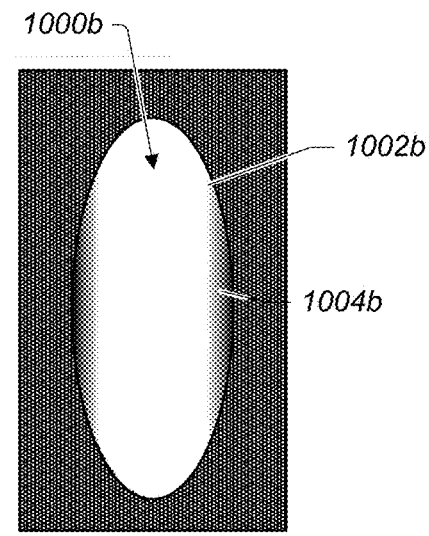
FIG. 10A    FIG. 10B

APERTURE STOP FOR CAMERA WITH FOLDED OPTICS

This application claims benefit of priority to U.S. Provisional Application No. 62/883,545, filed Aug. 6, 2019, titled "Aperture Stop for Camera with Folded Optics", which is hereby incorporated by reference in its entirety.

BACKGROUND

Technical Field

This disclosure relates generally to an aperture stop for a camera with folded optics.

Description of the Related Art

The advent of small, mobile multipurpose devices such as smartphones and tablet or pad devices has resulted in a need for high-resolution, small form factor cameras for integration in the devices. Some small form factor cameras may incorporate optical image stabilization (OIS) mechanisms that may sense and react to external excitation/disturbance by adjusting location of the optical lens on the X and/or Y axis in an attempt to compensate for unwanted motion of the lens. Some small form factor cameras may incorporate an autofocus (AF) mechanism whereby the object focal distance can be adjusted to focus an object plane in front of the camera at an image plane to be captured by the image sensor. In some such autofocus mechanisms, the optical lens is moved as a single rigid body along the optical axis of the camera to refocus the camera.

BRIEF DESCRIPTION OF THE DRAWINGS

FIGS. 8A-10B illustrate example elongated aperture stops for a camera with a folded optics arrangement, in accordance with some embodiments. In some embodiments, an elongated aperture stop may be located proximate a prism (e.g., an optically powered prism) of the folded optics arrangement.

Figure 1A:
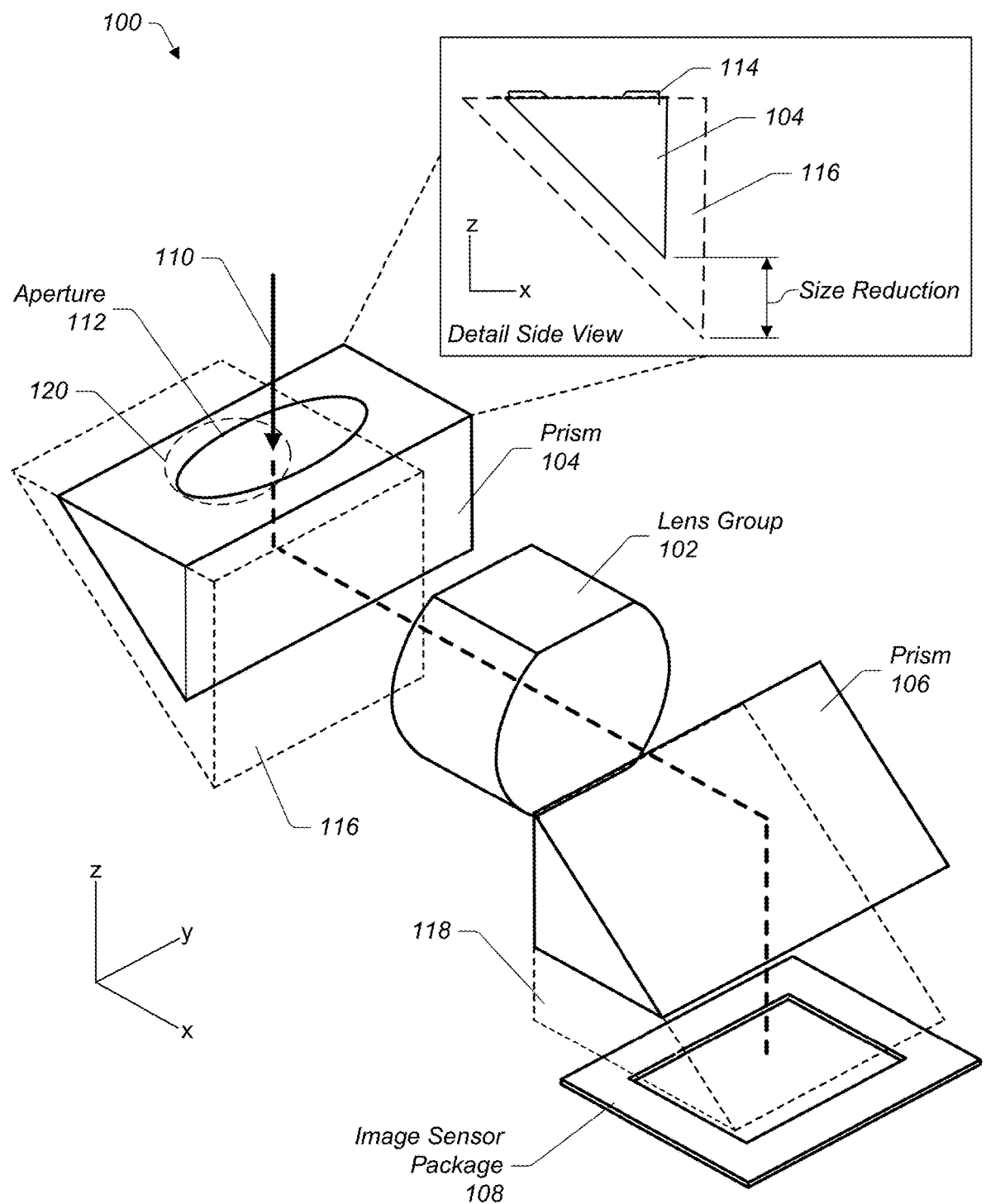
FIGS. 1A-1B illustrate a perspective view and a side view, respectively, of an example camera that includes a folded optics arrangement and an elongated aperture stop, e.g., to enable a height reduction of one or more components of the camera, in accordance with some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . " Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments include camera components and/or optical components that are shaped to enable a size reduction of an imaging system. For example, a camera may include a folded optics arrangement and an elongated aperture stop. In some examples, the folded optics arrangement may include a lens group between prisms (one or more of which may be elongated prisms). The elongated aperture stop may allow light to pass to at least a portion of the folded optics arrangement, and the light may pass through the folded optics arrangement and to an image sensor. According to various examples, one dimension of the elongated aperture stop is longer than another dimension of the elongated aperture stop. For example, the elongated aperture stop may have a first dimension in a first direction, and a second dimension in a second direction that is orthogonal to the first direction. The first dimension may be longer than the second dimension. Furthermore, the first dimension may be the longest dimension of the elongated aperture stop in some examples. Compared to a camera with some other type of aperture stop (e.g., a circular aperture stop) and a same f-number ("circular aperture stop camera"), the elongated aperture stop and/or one or more prisms of the folded optics arrangement may have a reduced dimension (e.g., a reduced height dimension) in at least one direction, and an increased dimension in in least one other direction (e.g., an increased width dimension). In some non-limiting examples, such increased dimension(s) may allow for the camera to capture an amount of light that is the same as (or similar to) the amount of light as the circular aperture stop camera.

Figure 15:
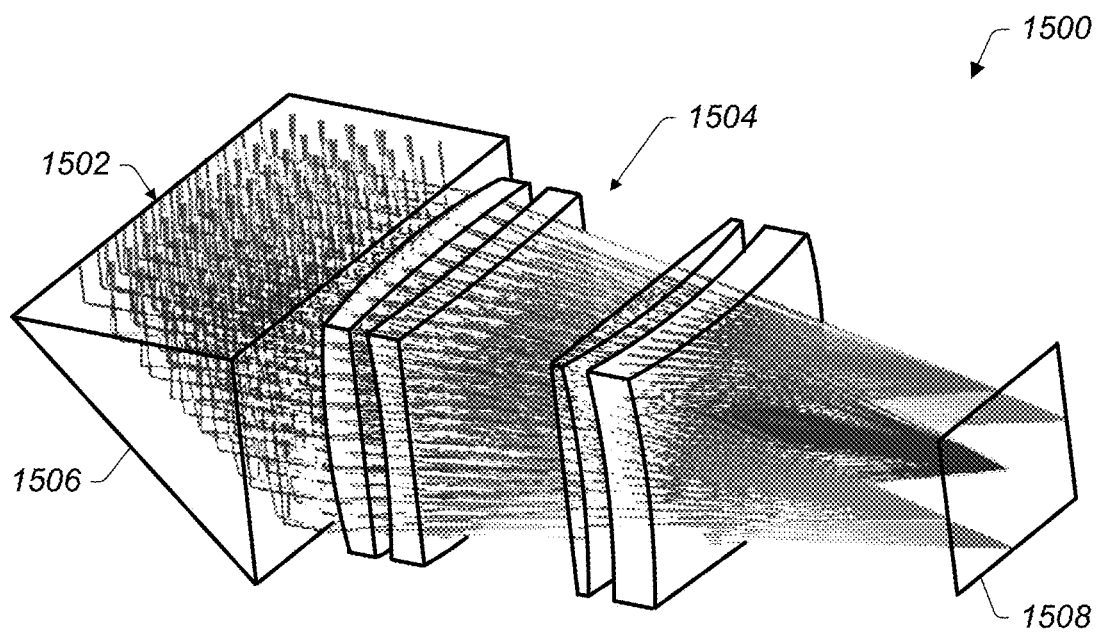
FIG. 15 illustrates an example of a single-fold light path through a camera that includes a folded optics arrangement and an elongated aperture stop (e.g., a rectangle-ellipse hybrid aperture stop), in accordance with some embodiments.

Some embodiments include a camera comprising a folded optics arrangement, an image sensor, and an aperture portion defining an elongated aperture stop. The folded optics arrangement may be configured to fold a path of light. In various embodiments, the folded optics arrangement may include one or more light path folding elements (e.g., a prism and/or a mirror) and one or more lens groups. In some embodiments, the folded optics arrangement may include a first prism, a second prism, and a lens group disposed between the first prism and the second prism. However, the folded optics arrangement may have fewer (e.g., a single prism as indicated in FIG. 15) or more prisms (or mirrors) in other embodiments. The lens group may include one or more lens elements. The image sensor may be configured to capture light that has passed through the folded optics arrangement.

In some embodiments, the elongated aperture stop may allow light to pass to at least a portion of the folded optics arrangement. The elongated aperture stop may have an elongated dimension in a direction that is orthogonal to an optical axis defined by the lens group and parallel to a plane defined by the image sensor. The first prism and/or the second prism may have a respective elongated dimension in the direction that is orthogonal to the optical axis defined by the lens group and parallel to the plane defined by the image sensor. The respective elongated dimension of the first prism and/or the second prism may be greater than or equal to the elongated dimension of the elongated aperture stop.

In some examples, the aperture portion may be located proximate the first prism such that the light passes through the elongated aperture stop before the light enters the first prism. In some examples, the aperture portion may be located between the first prism and the lens group such that the light passes through the first prism before it passes through the elongated aperture stop, and such that the light passes through the elongated aperture stop before it passes through the lens group.

In some examples, the camera may include an optical element to optically power the first prism. For example, the optical element may be adjacent to a top portion of the first prism and/or integrated with the top portion of the first prism. According to some embodiments, the aperture portion may be located proximate the optical element such that light passes through the elongated aperture stop before it passes through the optical element.

Some embodiments include a device comprising one or more processors, memory, and a camera. The memory may store program instructions executable by the one or more processors to control operation of the camera. The camera may include a folded optics arrangement, an image sensor, and an aperture portion defining an elongated aperture stop.

Some embodiments include a folded optics system comprising a lens group, a first prism, a second prism, and an aperture portion defining an elongated aperture stop. The lens group may include one or more lens elements. The first prism may redirect light to the lens group. The second prism may receive the light from the lens group and redirect the light to an image sensor.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that some embodiments may be practiced without these specific details. In other instances, well-known methods, procedures, components, circuits, and networks have not been described in detail so as not to unnecessarily obscure aspects of the embodiments.

Figure 1B:
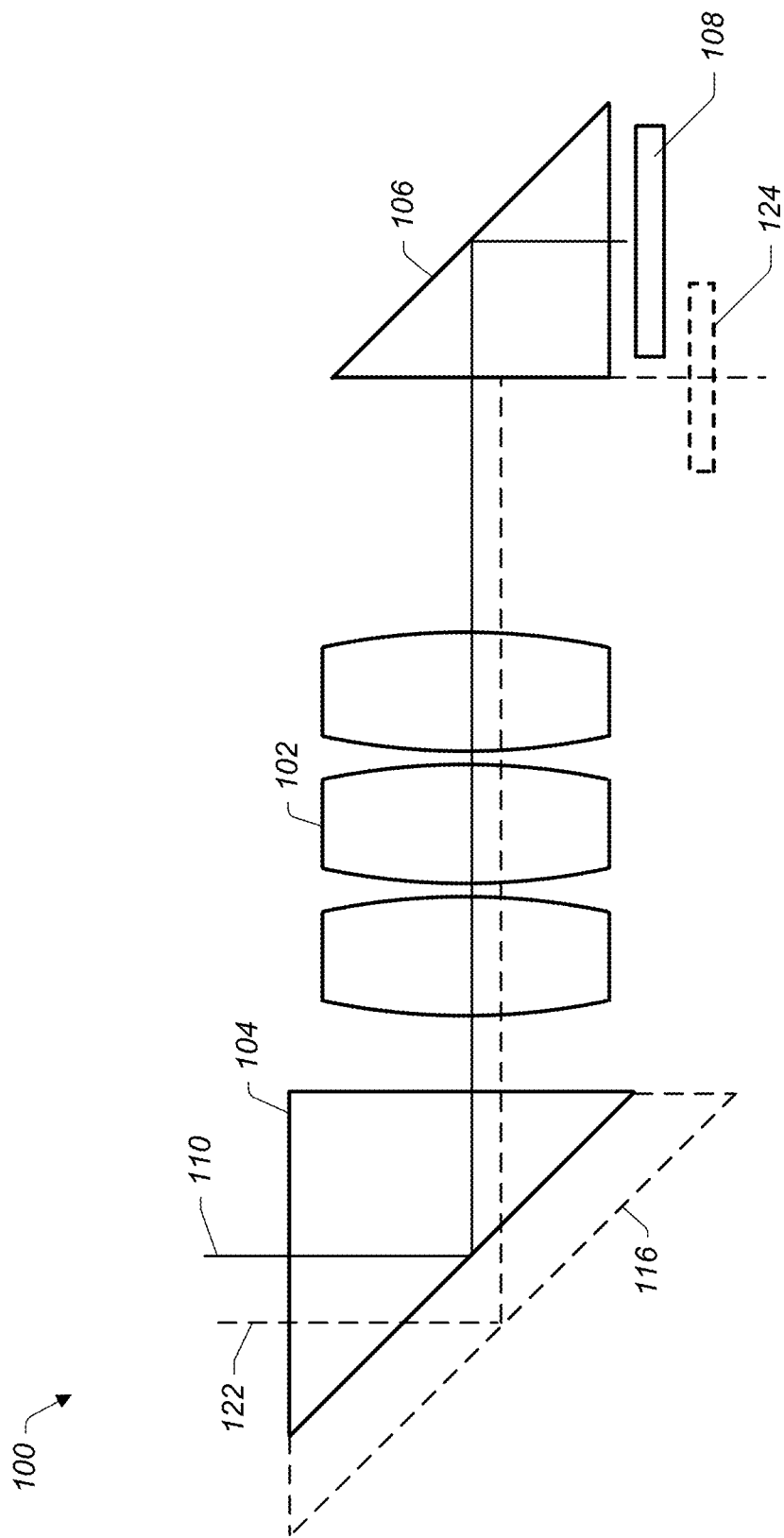

Described here are folded optics arrangements with aperture stop(s) that enable a reduced-size imaging system. The arrangements discussed throughout generally comprise one or more lenses positioned between one or more light path folding elements, which collectively provides a folded light path. FIGS. 1A-1B show a generalized example of a camera 100 that includes a folded optics arrangement and an elongated aperture stop. In some non-limiting examples, the camera 100 may be a telephoto lens camera. The example X-Y-Z coordinate system shown in FIG. 1A is used to discuss aspects of systems and/or system components, and may apply to embodiments described throughout this disclosure.

In various embodiments, the camera 100 may include a lens group 102, a first prism 104, a second prism 106, and an image sensor package 108. The lens group 102 may include one or more lens elements. In some embodiments, the lens group 102 may be located between the first prism 104 and the second prism 106, forming the folded optics arrangement. Light may follow an optical path 110 that is folded by the first prism 104 such that the light is directed towards the lens group 102, passes through the lens group 102, and is folded by the second prism 106 such that the light is directed towards the image sensor package 108. In some examples, light may enter an object side of the first prism 104 along the Z-axis. The first prism 104 may redirect the light to propagate along the X-axis (which may be parallel to an optical axis defined by the lens group 102) towards the lens group 102. The second prism 106 may redirect the light to propagate along the Z-axis (which may be orthogonal to a plane defined by the image sensor package 108), e.g., such that the light exits an image side of the second prism 106 towards the image sensor package 108. The first prism 104, the lens group 102, and/or the second prism 106 may be positioned along a common axis (e.g., the X-axis, the optical axis defined by the lens group 102, etc.). According to some examples, the optical path 110 may be contained within a plane (e.g., the X-Z plane), and the image sensor package 108 may extend along a different plane (e.g., the X-Y plane).

In some embodiments, the object side of the first prism 104 may extend along the X-Y plane. Furthermore, the first prism 104 may include a pair of opposing lateral sides that each extend along the X-Z plane, a lens group facing side that extends along the Y-Z plane, and a reflecting surface side that is angled relative to one or more of the other sides of the first prism 104. For example, the reflecting surface side of the first prism 104 may include a reflective surface that is angled so as to redirect light received from the object side of the first prism 104 towards the lens group 102 (via the lens group facing side of the first prism 104), as discussed above.

In some embodiments, the image side of the second prism 106 may extend along the X-Y plane, e.g., proximate the image sensor package 108. Furthermore, the second prism 106 may include a pair of opposing lateral sides that each extend along the X-Z plane, a lens group facing side that extends along the Y-Z plane, and a reflecting surface side that is angled relative to one or more of the other sides of the second prism 106. For example, the reflecting surface side of the second prism 106 may include a reflective surface that is angled so as to redirect light received from the lens group 102 (via the lens group facing side of the second prism 106) towards the image sensor package (via the image side of the second prism 106), as discussed above.

According to various embodiments, the camera 100 may include an aperture stop 112 (also referred to herein as an "elongated aperture stop") that is defined by an aperture portion 114. The elongated aperture stop 112 may be configured to allow light to pass to at least a portion of the folded optics arrangement and to the image sensor package 108, while the aperture portion 114 may be configured to block light (e.g., light that is incident on a front surface of the aperture portion 114). In some non-limiting examples, the aperture portion 114 may be located proximate the first prism 104 such that the light passes through the elongated aperture stop 112 before the light enters the first prism, e.g., as indicated in FIG. 1A. In some embodiments, the image sensor package 108 may define a first plane, and the aperture portion 114 may define a second plane that is parallel to the first plane. While the aperture portion 114 is shown in FIG. 1A as being located proximate the first prism 104, the aperture portion 114 and/or the elongated aperture stop 112 may be in other locations of the camera 100 in various embodiments, e.g., as discussed below with reference to FIGS. 2 and 6.

In various examples, the elongated aperture stop 112 may have a elongated dimension in a direction (e.g., the Y-axis direction) that is orthogonal to the optical axis defined by the lens group 102 and parallel to a plane defined by the image sensor package 108. Furthermore, the first prism 104 and/or the second prism 106 may have a respective elongated dimension in the same direction (e.g., the Y-axis direction). For example, as indicated in FIG. 1A, the elongated aperture stop 112, the first prism 104, and the second prism 106 are elongated in the same direction (the Y-axis direction). In some examples, the respective elongated dimension of the first prism 104 and/or the second prism 106 may be greater than or equal to the elongated dimension of the elongated aperture stop 112.

FIG. 1A also shows, in dashed lines, example sizes and shapes of prisms (e.g., prisms 116 and 118) that may be used in the camera 100 if the camera 100 were to, instead of the elongated aperture stop 112, include another type of aperture stop, such as a circular aperture stop 120. For convenience of discussion, the arrangement indicated by the dashed lines may also be referred to herein as the "circular aperture stop camera." As indicated in FIG. 1A, the first prism 104 may be smaller in one or more dimensions than the corresponding dashed line prism 116 of the circular aperture stop camera. Similarly, the second prism 106 may be smaller in one or more dimensions than the corresponding dashed line prism 118 of the circular aperture stop camera. The elongated aperture stop 112 may have a same area as the circular aperture stop 120, e.g., such that they would each allow a same amount of light to pass through. The elongated aperture stop 112 may be longer than the circular aperture stop 120 in a first dimension (e.g., in the Y-axis dimension), but shorter than the circular aperture stop 120 in a second dimension (e.g., in the X-axis dimension). The comparatively reduced dimension of the elongated aperture stop 112 may result in a corresponding reduction in an extent of light (e.g., an extent in the Z-axis direction) that is allowed to pass through the folded optics arrangement and to the image sensor package 108. As such, in various embodiments the elongated aperture stop 112 may enable the first prism 104 and/or the second prism 106 to have a reduced height dimension (e.g., in the Z-axis direction) without restricting the desired amount of light from reaching the image sensor package 108. As indicated in FIG. 1A, the first prism 104 and/or the second prism 106 may additionally, or alternatively, have one or more other reduced dimensions (e.g., in the X-axis direction).

FIG. 1B indicates, in dashed lines, an optical path 122 of light and an image sensor package 124 of the circular aperture stop camera. While the dashed line prism 118 of the circular aperture stop camera is not shown in FIG. 1B, this figure indicates a position at which the dashed line prism 118 would fold the optical path 122 of light towards the image sensor package 124. In some embodiments, the camera 100 may have a length dimension in the X-axis direction that is greater than a length dimension of the circular aperture stop camera, as indicated in FIG. 1B. Additionally, or alternatively, the camera 100 may have a height dimension in the Z-axis direction that is less than a height dimension of the circular aperture stop camera. For example, as indicated in FIG. 1B, a distance (in the Z-axis direction) between the image sensor package 108 and the second prism 106 of the camera 100 may be less than a distance (in the Z-axis direction) between the image sensor package 124 and the dashed line image sensor package 124 of the circular aperture stop camera.

While the light path folding elements are shown in various figures as comprising prisms (e.g., the first prism 104 and the second prism 106), the camera systems and/or folded optics arrangements described herein may include any suitable light path folding element (e.g., a mirror or the like) or combination of elements. In some embodiments, one or more of the light path folding elements may also act as a lens element (or combination of lens elements). For example, one or more lens elements (e.g., other than those of the lens group 102) may be integrated with the first prism 104 (and/or the second prism 106) such that the prism acts as a lens element. Additionally, or alternatively, the first prism 104 (and/or the second prism 106) may be shaped such that the prism acts as a lens element.

Figure 2:
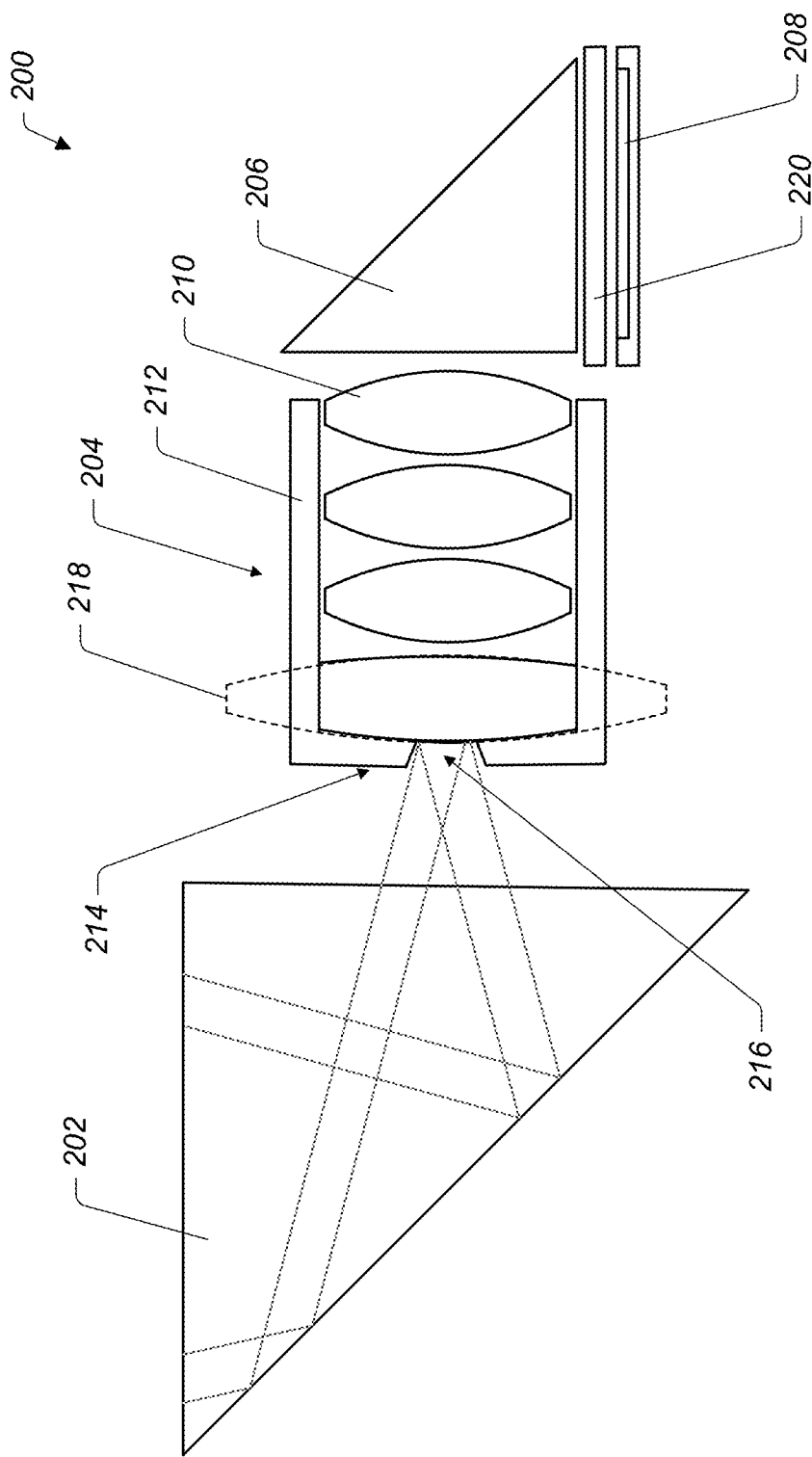
FIG. 2 illustrates another example camera that includes a folded optics arrangement and an elongated aperture stop, in accordance with some embodiments.

As noted above, various folded optics arrangements described herein may be used in conjunction with an elongated aperture stop shaped to enable a size reduction (e.g., a reduced height dimension in the Z-axis direction) of an imaging system. FIG. 2 illustrates another example camera 200 that includes a folded optics arrangement and an elongated aperture stop. In some non-limiting examples, the camera 200 may be a telephoto lens camera.

In some embodiments, the camera 200 may include a first prism 202, a lens group 204, a second prism 206, and an image sensor 208. The lens group 204 may include one or more lens elements 210 (e.g., lens elements disposed within a lens barrel 212). In some embodiments, the first prism 202 and the second prism 206 may be positioned along an optical axis defined by the lens group 204. Furthermore, in some embodiments, the image sensor 208 may define a plane that is parallel to the optical axis defined by the lens group 204.

Figure 3:
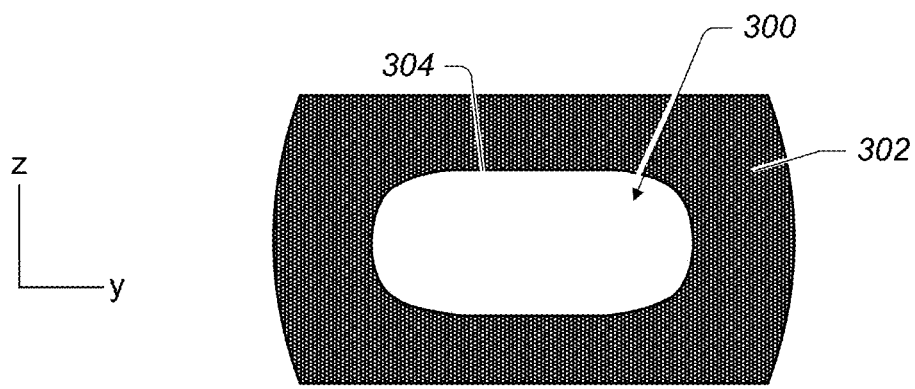
FIGS. 3-5 illustrate example elongated aperture stops for a camera with a folded optics arrangement, in accordance with some embodiments. In some embodiments, an elongated aperture stop may be located between a prism and a lens group of the folded optics arrangement.
Figure 4:
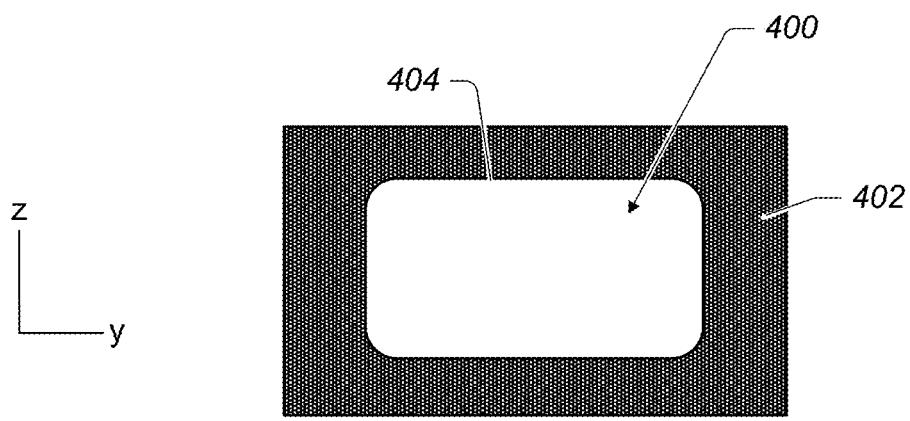
Figure 5:
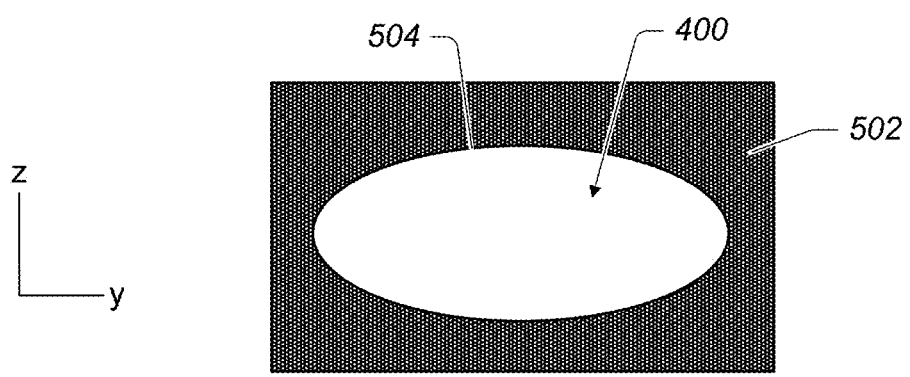

According to various embodiments, the camera 200 may include an aperture portion 214 that defines an elongated aperture stop 216. The elongated aperture stop 216 may allow light to pass to at least a portion of the folded optics arrangement and to the image sensor 208 (e.g., via the folded optics arrangement), while the aperture portion 214 may be configured to block light (e.g., light that is incident on a front surface of the aperture portion 214). In some examples, the elongated aperture stop 216 may be nonrotationally symmetric. FIGS. 3-5 and 8A-10B, described below, provide some non-limiting examples of elongated aperture stops that may be used in various embodiments of the cameras and/or folded optics arrangements described herein (e.g., the cameras described with reference to FIGS. 1A-2 and 6). Compared to a circular aperture stop of another camera with the same f-number, for example, the elongated aperture stop 216 of the camera 200 may have a reduced dimension in one direction and an elongated dimension in another dimension. In some examples, the elongated aperture stop 216 may have a reduced dimension in the Z-axis direction and an elongated dimension in the Y-axis direction, e.g., as indicated in FIGS. 3-5. The reduced dimension of the elongated aperture stop 216 may allow for a reduction in at least one dimension of one or more optical elements of the folded optics arrangement of the camera 200, such as a reduction in a height dimension in the Z-axis direction of the first prism 202, the lens group 204, and/or the second prism 206, etc. For example, the first prism 202 and/or the second prism 206 may be elongated and may have a reduced height dimension, such as the prism 700 described below with reference to FIG. 7.

In some non-limiting examples, the aperture portion 214 may be located between the first prism 202 and the lens group 204 such that the light passes through the first prism 202 before it passes through the elongated aperture stop 216, and such that the light passes through the elongated aperture stop 216 before it passes through the lens group 204, e.g., as indicated in FIG. 2. In some embodiments, the image sensor 208 may define a first plane, and the aperture portion 214 may define a second plane that is orthogonal to the first plane. While the aperture portion 214 is shown in FIG. 2 as being located between the first prism 202 and the lens group 204, the aperture portion 214 and/or the elongated aperture stop 216 may be in other locations of the camera 200 in various embodiments, e.g., as discussed herein with reference to FIGS. 1A-1B and 6.

In various examples, the elongated aperture stop 216 may have a elongated dimension in a direction (e.g., the Y-axis direction) that is orthogonal to an optical axis defined by the lens group 204 and parallel to a plane defined by the image sensor 208. Furthermore, the first prism 202 and/or the second prism 206 may have a respective elongated dimension in the same direction (e.g., the Y-axis direction). In some examples, the respective elongated dimension of the first prism 202 and/or the second prism 206 may be greater than or equal to the elongated dimension of the elongated aperture stop 216.

In some examples, the aperture portion 214 may be a portion of the lens barrel 212, e.g., as indicated in FIG. 2. For example, the lens barrel 212 may include a portion (e.g., the aperture portion 214) that extends orthogonal to the optical axis defined by the lens group 204. In other examples, the aperture portion 214 may be a separate component from the lens barrel 212. For instance, the aperture portion 214 may be a component that is attached to (or otherwise coupled with) the lens barrel 212 and/or another component of the camera 200.

In some embodiments, one or more of the lens elements 210 may be truncated, e.g., so as to reduce (e.g., based at least in part on the shape of the elongated aperture stop 216) the dimension of the lens element(s) 210 in the Z-axis direction. For example, in some other cameras with a different aperture stop shape (e.g., a circular aperture stop) than the camera 200 and with a same f-number as the camera 200, a lens element may be sized as indicated by dashed line lens element 218, instead of being truncated or otherwise sized with the reduced dimension of lens element(s) 210 used in conjunction with the elongated aperture stop 216.

According to some examples, the camera 200 may include an optical filter 220 (e.g., an infrared filter). In some embodiments, the optical filter 220 may be located between the second prism 206 and the image sensor 208, e.g., as indicated in FIG. 2.

FIGS. 3-5 illustrate example elongated aperture stops for a camera with a folded optics arrangement. In some embodiments, an elongated aperture stop may be located between a prism and a lens group of the folded optics arrangement. For example, like the elongated aperture stop 216 in FIG. 2, in some embodiments the elongated aperture stops described FIGS. 3-5 may be located between the first prism 202 and the lens group 204.

FIG. 3 shows an example elongated aperture stop 300 that may be defined by an aperture portion 302. The elongated aperture stop 300 may have a first dimension in the Z-axis direction. As noted above, in various embodiments the Z-axis direction may be considered the direction in which the height of the elongated aperture stop 300 (and/or a system that includes the elongated aperture stop 300) is measured. In some embodiments, the first dimension may be the shortest dimension of the elongated aperture stop 300. Furthermore, in some embodiments, the first dimension may be in a direction that is orthogonal to the optical axis. The elongated aperture stop 300 may also have a second dimension in the Y-axis direction. As indicated in FIG. 3, the second dimension may be longer than the first dimension. Furthermore, the second dimension may be an elongated dimension of the elongated aperture stop 300, and may provide, at least in part, the "elongated" attribute of the elongated aperture stop 300.

According to various embodiments, the aperture portion 302 may define a perimeter of the elongated aperture stop 300 via one or more edges (collectively referred to herein as the "edge 304"). In some non-limiting examples, the elongated aperture stop 300 may be shaped as a rectangle-ellipse hybrid. For example, one or more portions of the elongated aperture stop 300 may be rectangular in shape, and one or more portions of the elongated aperture stop 300 may be elliptical in shape.

FIG. 4 shows another example elongated aperture stop 400 that may be defined by an aperture portion 402. The elongated aperture stop 400 may have a first dimension in the Z-axis direction. As noted above, in various embodiments the Z-axis direction may be considered the direction in which the height of the elongated aperture stop 400 (and/or a system that includes the elongated aperture stop 400) is measured. In some embodiments, the first dimension may be the shortest dimension of the elongated aperture stop 400. Furthermore, in some embodiments, the first dimension may be in a direction that is orthogonal to the optical axis. The elongated aperture stop 400 may also have a second dimension in the Y-axis direction. As indicated in FIG. 4, the second dimension may be longer than the first dimension. Furthermore, the second dimension may be an elongated dimension of the elongated aperture stop 400, and may provide, at least in part, the "elongated" attribute of the elongated aperture stop 400.

According to various embodiments, the aperture portion 402 may define a perimeter of the elongated aperture stop 400 via one or more edges (collectively referred to herein as the "edge 404"). In some non-limiting examples, the elongated aperture stop 402 may be rectangular (or otherwise substantially rectangular) in shape. The edge 404 may have straight top and bottom portions, straight side portions, and curved corner portions that connect the straight top and bottom portions with the straight side portions, e.g., as shown in FIG. 4. The top and bottom portions of the edge 404 may be opposite one another with respect to the elongated aperture stop 400. Likewise, the side portions of the edge 404 may be opposite one another with respect to the elongated aperture stop 400. The edge 404 may be used herein to refer to an edge of the aperture portion 402 and/or an edge of the elongated aperture stop 400.

FIG. 5 shows another example elongated aperture stop 500 that may be defined by an aperture portion 502. The elongated aperture stop 500 may have a first dimension in the Z-axis direction. As noted above, in various embodiments the Z-axis direction may be considered the direction in which the height of the elongated aperture stop 500 (and/or a system that includes the elongated aperture stop 500) is measured. In some embodiments, the first dimension may be the shortest dimension of the elongated aperture stop 500. Furthermore, in some embodiments, the first dimension may be in a direction that is orthogonal to the optical axis. The elongated aperture stop 500 may also have a second dimension in the Y-axis direction. As indicated in FIG. 5, the second dimension may be longer than the first dimension. Furthermore, the second dimension may be an elongated dimension of the elongated aperture stop 500, and may provide, at least in part, the "elongated" attribute of the elongated aperture stop 500.

According to various embodiments, the aperture portion 502 may define a perimeter of the elongated aperture stop 500 via one or more edges (collectively referred to herein as the "edge 504"). In some non-limiting examples, the elongated aperture stop 502 may be oval in shape. The edge 504 may be curved and elongated in the Y-axis direction, e.g., as shown in FIG. 5. The edge 504 may be used herein to refer to an edge of the aperture portion 502 and/or an edge of the elongated aperture stop 500.

Figure 6:
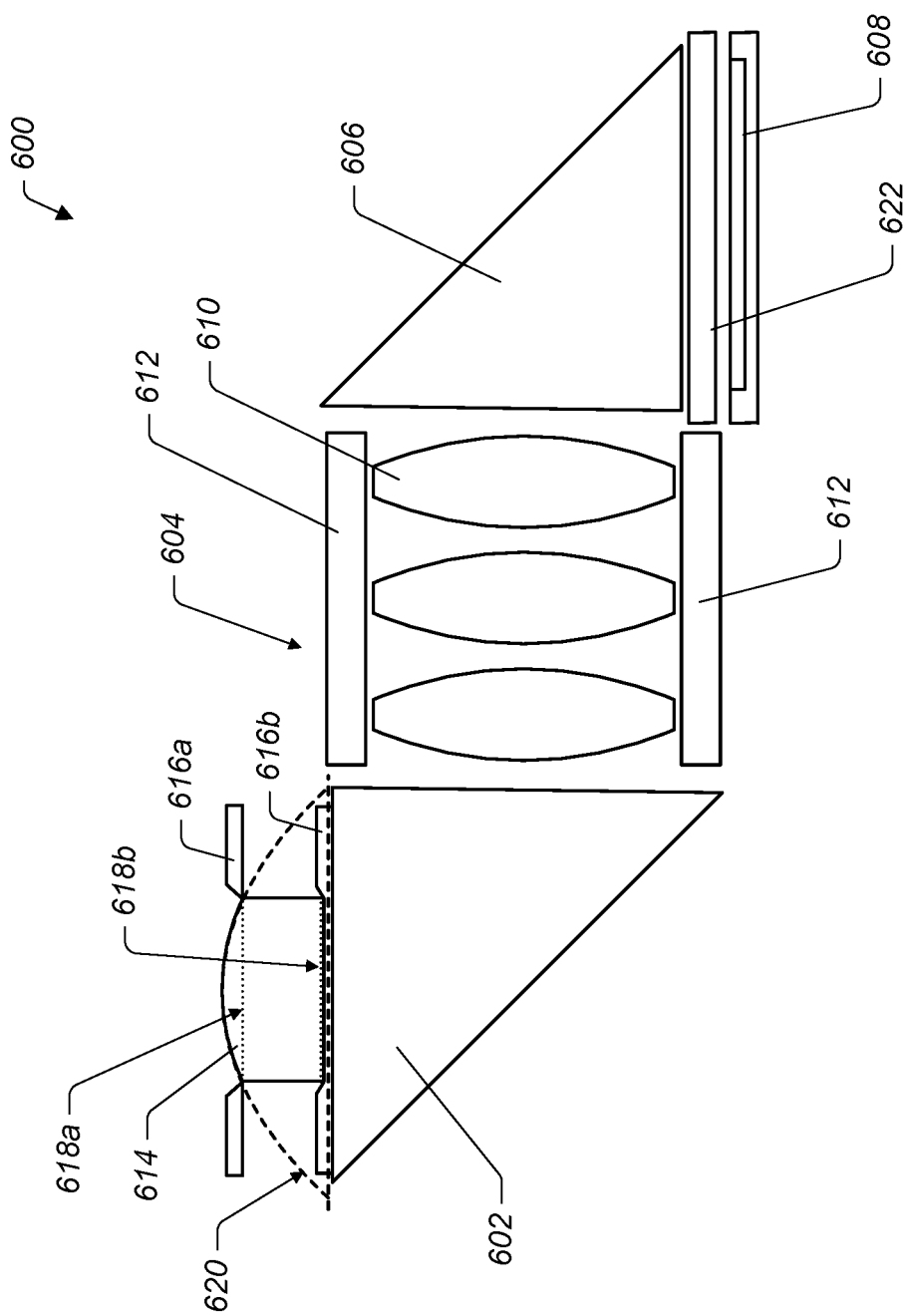
FIG. 6 illustrates another example camera that includes a folded optics arrangement and an elongated aperture stop, in accordance with some embodiments. The example camera shown in FIG. 6 includes at least one optically powered prism, in accordance with some embodiments.

FIG. 6 illustrates another example camera 600 that includes a folded optics arrangement and an elongated aperture stop. In some non-limiting examples, the camera 600 may be a telephoto lens camera. As will be discussed below, the folded optics arrangement may include at least one optically powered prism.

In some embodiments, the camera 600 may include a first prism 602, a lens group 604, a second prism 606, and an image sensor 608. The lens group 604 may include one or more lens elements 610 (e.g., lens elements disposed within a lens barrel 612). According to various embodiments, one or more of the prisms may be considered an optically powered prism. For example, the first prism 602 and/or the second prism 606 may be optically powered using one or more optical elements. As a non-limiting example, an optical element 614 may be disposed proximate the first prism 602, e.g., as indicated in FIG. 6. In some embodiments, the optical element 614 may be located adjacent a top portion of the first prism 602 and/or integrated with a top portion of the first prism 602. According to some embodiments, the optical element 614 may comprise a lens (e.g., a concave lens). Additionally, or alternatively, the optical element 614 may comprise a deformable membrane that may be deformed (e.g., via one or more actuators and/or fluid that may be displaced to change the shape of the deformable membrane) to vary the optical power of the optical element 614 and/or the first prism 602.

According to various embodiments, the camera 600 may include an aperture portion 616 (e.g., aperture portion 616a and/or aperture portion 616b) that defines an elongated aperture stop 618 (e.g., elongated aperture stop 618a and/or elongated aperture stop 618b). The elongated aperture stop 618 may allow light to pass to at least a portion of the folded optics arrangement and to the image sensor 608 (e.g., via the folded optics arrangement). In some examples, the elongated aperture stop 618 may be nonrotationally symmetric. FIGS. 3-5 and 8-12, described above and below, provide some non-limiting examples of elongated aperture stops that may be used in various embodiments of the cameras and/or folded optics arrangements described herein (e.g., the cameras described with reference to FIGS. 1, 2, and 6). Compared to a circular aperture stop of another camera with a same f-number, for example, the elongated aperture stop 216 of the camera 600 may have a reduced dimension in one direction and an elongated dimension in another dimension. In some examples, the elongated aperture stop 618 may have a reduced dimension in the X-axis direction and an elongated dimension in the Y-axis direction, e.g., as indicated in FIGS. 8A-10B. The reduced dimension may allow for a reduction in at least one dimension of one or more optical elements of the folded optics arrangement of the camera 600, such as a reduction in a height dimension in the Z-axis direction of the first prism 602, the lens group 604, and/or the second prism 606, etc. For example, the first prism 602 and/or the second prism 606 may be elongated and may have a reduced height dimension, such as the prism 700 described below with reference to FIG. 7.

In some embodiments, the aperture portion 616 may be located proximate the first prism 602 such that light passes through the elongated aperture stop 618 before the light enters the first prism 602. Such may be the case with either an unpowered prism or a powered prism in various embodiments. In some embodiments that include a powered prism, the aperture portion 616 may be located proximate the optical element 614 such that light passes through the elongated aperture stop 618 before it passes through the optical element 614. In some examples, the image sensor 608 may define a first plane, and the aperture portion 616 may define a second plane that is parallel to the first plane. While the aperture portion 616 is shown in FIG. 6 as being located proximate the first prism 602 and/or proximate the optical element 614, the aperture portion 616 may be in other locations of the camera 600 in various embodiments, e.g., as discussed herein with reference to FIGS. 1A-2.

In various examples, the elongated aperture stop 618 may have an elongated dimension in a direction (e.g., the Y-axis direction) that is orthogonal to an optical axis defined by the lens group 604 and parallel to a plane defined by the image sensor 608. Furthermore, the first prism 602 and/or the second prism 606 may have a respective elongated dimension in the same direction (e.g., the Y-axis direction). In some examples, the respective elongated dimension of the first prism 602 and/or the second prism 606 may be greater than or equal to the elongated dimension of the elongated aperture stop 618.

In some embodiments, the optical element 614 may be truncated, e.g., so as to reduce (e.g., based at least in part on the shape of the elongated aperture stop 618) one or more dimensions of the optical element 614. For example, in some other cameras with a different aperture stop shape (e.g., a circular aperture stop) than the camera 600 and with a same f-number as the camera 600, an optical element may be sized as indicated by dashed line optical element 620, instead of being truncated or otherwise sized with the reduced dimension(s) of optical element 614 used in conjunction with the elongated aperture stop 618.

According to some examples, the camera 600 may include an optical filter 622 (e.g., an infrared filter). In some embodiments, the optical filter 622 may be located between the second prism 606 and the image sensor 608, e.g., as indicated in FIG. 6.

Figure 7:
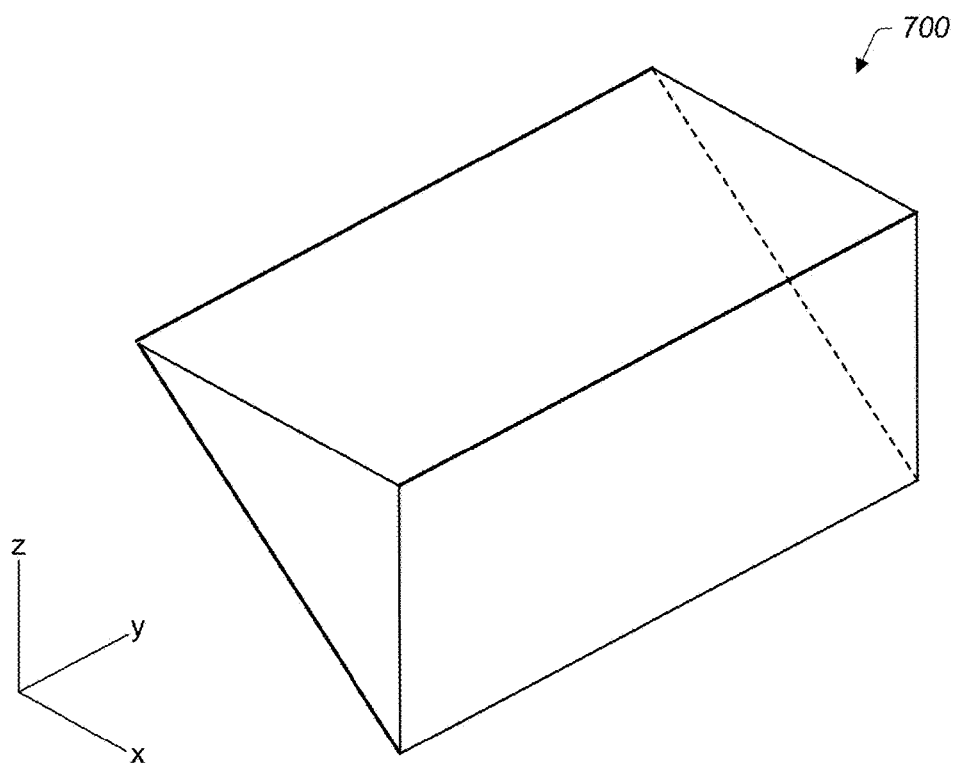
FIG. 7 illustrates an example elongated prism that may be used in a folded optics arrangement, in accordance with some embodiments. In some embodiments, the elongated prism may be located proximate an elongated aperture stop.

FIG. 7 illustrates an example prism 700 that may be used in a camera with a folded optics arrangement that includes an elongated aperture stop, such as camera 200 (e.g., the prism 700 may be used as the first prism 202 and/or the second prism 206) and/or camera 600 (e.g., the prism 700 may be used as the first prism 602 and/or the second prism 606). In various embodiments, the prism 700 may have a reduced dimension in a first dimension (e.g., the Z-axis dimension), and an elongated dimension in a second direction (e.g., in the Y-axis dimension).

FIGS. 8A-10B illustrate example elongated aperture stops for a camera with a folded optics arrangement. In some embodiments, an elongated aperture stop may be located proximate a prism (e.g., an optically powered prism) of the folded optics arrangement. For example, like the elongated aperture stop 618 in FIG. 6, in some embodiments the elongated aperture stops described in FIGS. 8A-10B may be located proximate the first prism 602 and/or the optical element 614.

Figures 8A, 8B:
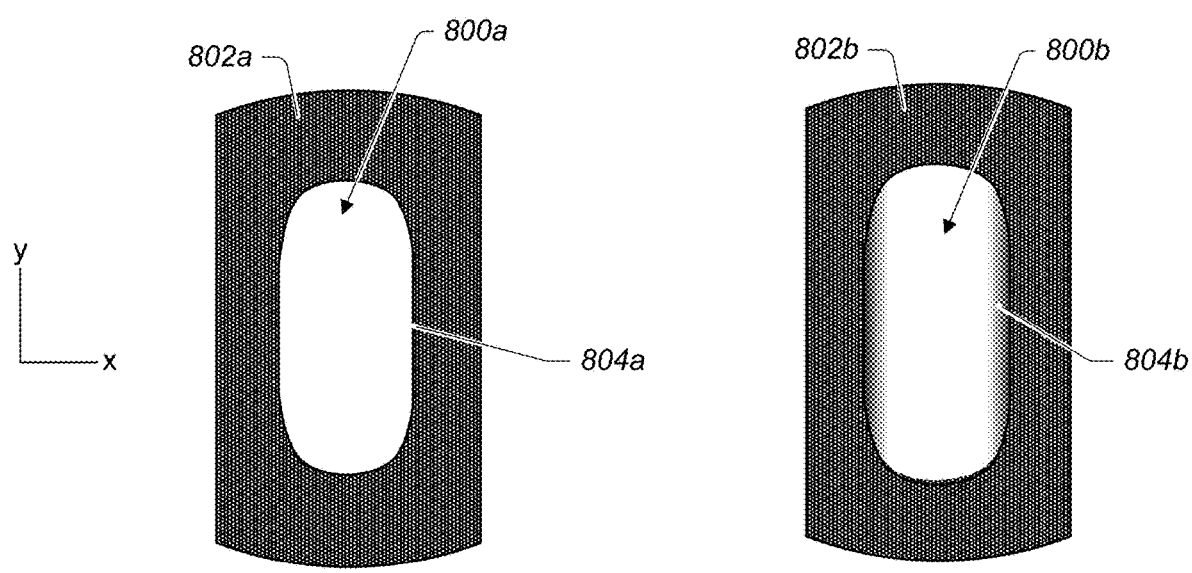

FIG. 8A shows an example elongated aperture stop 800a that may be defined by an aperture portion 802. The elongated aperture stop 800a may have a first dimension in the X-axis direction. In some embodiments, the first dimension may be the shortest dimension of the elongated aperture stop 800a. Furthermore, in some embodiments, the first dimension may be in a direction that is parallel to the optical axis. The elongated aperture stop 800a may also have a second dimension in the Y-axis direction. As indicated in FIG. 8A, the second dimension may be longer than the first dimension. Furthermore, the second dimension may be an elongated dimension of the elongated aperture stop 800a, and may provide, at least in part, the "elongated" attribute of the elongated aperture stop 800a.

According to various embodiments, the aperture portion 802a may define a perimeter of the elongated aperture stop 800a via one or more edges (collectively referred to herein as the "edge 804a"). In some non-limiting examples, the edge 804a may be shaped similar to the edge 304 described above with reference to FIG. 3, but oriented and/or located differently as described herein and as indicated in FIG. 8A. The edge 804a may be used herein to refer to an edge of the aperture portion 802a and/or an edge of the elongated aperture stop 800a.

FIG. 8B shows an example elongated aperture stop 800b that may be defined by an aperture portion 802b. In various examples, the elongated aperture stop 800b may be shaped like the elongated aperture stop 800a described above with reference to FIG. 8A. The aperture portion 802b may include a gradation portion 804b along an edge of the elongated aperture stop 800b. The gradation portion 804b may be configured to avoid or otherwise limit diffraction of light at the edge of the elongated aperture stop 800b, which may improve the modulation transfer function (MTF) over low-to-middle frequencies by apodization. Additionally, or alternatively, the gradation portion 804b may be configured to avoid or otherwise limit stray light issues that may arise from light being reflected off of one or more portions of the edge of the elongated aperture stop 800b. In some embodiments, such stray light may otherwise (e.g., without the gradation portion 804b) cause light to gather in particular portion(s) of an image sensor, which may result in undesirable optical aberrations in images captured via the image sensor. According to various examples, the gradation portion 804b may comprise a variation along the edge of the elongated aperture stop 800b. For example, the gradation portion 804b may comprise a variation in the shape of the edge, a variation in an amount of light transmission allowed by the gradation 804b between the rest of the aperture portion 802b (surrounding the gradation portion 804b) and the elongated aperture stop 800b, etc. While the elongated aperture stop 800b and the aperture portion 802b as shown in FIG. 8B as extending along the X-Y plane, the elongated aperture stop 800b and the aperture portion 802b may extend along the Y-Z plane (or another plane). In various embodiments, the gradation portion 804b may extend along one or more portions of the edge of the elongated aperture stop 800b. For example, FIG. 8B indicates that the gradation portion 804b extends along the long sides (e.g., in the Y-axis direction) of the edge. In other embodiments, however, the gradation portion 804b may extend along other portion(s) of the edge, or the gradation portion 804b may extend such that it completely encompasses the edge.

FIG. 9A shows another example elongated aperture stop 900 that may be defined by an aperture portion 902a. The elongated aperture stop 900a may have a first dimension in the X-axis direction. In some embodiments, the first dimension may be the shortest dimension of the elongated aperture stop 900a. Furthermore, in some embodiments, the first dimension may be in a direction that is parallel to the optical axis. The elongated aperture stop 900a may also have a second dimension in the Y-axis direction. As indicated in FIG. 9A, the second dimension may be longer than the first dimension. Furthermore, the second dimension may be an elongated dimension of the elongated aperture stop 900a, and may provide, at least in part, the "elongated" attribute of the elongated aperture stop 900a.

According to various embodiments, the aperture portion 902a may define a perimeter of the elongated aperture stop 900a via one or more edges (collectively referred to herein as the "edge 904a"). In some non-limiting examples, the edge 904a may be shaped similar to the edge 404 described above with reference to FIG. 4, but oriented and/or located differently as described herein and as indicated in FIG. 9A. The edge 904a may be used herein to refer to an edge of the aperture portion 902a and/or an edge of the elongated aperture stop 900a.

FIG. 9B shows an elongated aperture stop 900b that may be defined by an aperture portion 902b. In various examples, the elongated aperture stop 900b may be shaped like the elongated aperture stop 900a described above with reference to FIG. 9A. The aperture portion 902b may include a gradation portion 904b along an edge of the elongated aperture stop 900b. The gradation portion 904b may be configured to avoid or otherwise limit diffraction of light at the edge of the elongated aperture stop 900b, which may improve MTF over low-to-middle frequencies by apodization. Additionally, or alternatively, the gradation portion 904b may be configured to avoid or otherwise limit stray light issues that may arise from light being reflected off of one or more portions of the edge of the elongated aperture stop 900b. In some embodiments, such stray light may otherwise (e.g., without the gradation portion 904b) cause light to gather in particular portion(s) of an image sensor, which may result in undesirable optical aberrations in images captured via the image sensor. According to various examples, the gradation portion 904b may comprise a variation along the edge of the elongated aperture stop 900b. For example, the gradation portion 904b may comprise a variation in the shape of the edge, a variation in an amount of light transmission allowed by the gradation 904b between the rest of the aperture portion 902b (surrounding the gradation portion 904b) and the elongated aperture stop 900b, etc. While the elongated aperture stop 900b and the aperture portion 902b as shown in FIG. 9B as extending along the X-Y plane, the elongated aperture stop 900b and the aperture portion 902b may extend along the Y-Z plane (or another plane). In various embodiments, the gradation portion 904b may extend along one or more portions of the edge of the elongated aperture stop 900b. For example, FIG. 9B indicates that the gradation portion 904b extends along the long sides (e.g., in the Y-axis direction) of the edge. In other embodiments, however, the gradation portion 904b may extend along other portion(s) of the edge, or the gradation portion 904b may extend such that it completely encompasses the edge.

FIG. 10A shows another example elongated aperture stop 1000a that may be defined by an aperture portion 1002a. The elongated aperture stop 1000a may have a first dimension in the X-axis direction. In some embodiments, the first dimension may be the shortest dimension of the elongated aperture stop 1000a. Furthermore, in some embodiments, the first dimension may be in a direction that is parallel to the optical axis. The elongated aperture stop 1000a may also have a second dimension in the Y-axis direction. As indicated in FIG. 10A, the second dimension may be longer than the first dimension. Furthermore, the second dimension may be an elongated dimension of the elongated aperture stop 1000a, and may provide, at least in part, the "elongated" attribute of the elongated aperture stop 1000a.

According to various embodiments, the aperture portion 1002a may define a perimeter of the elongated aperture stop 1000a via one or more edges (collectively referred to herein as the "edge 1004a"). In some non-limiting examples, the edge 1004a may be shaped similar to the edge 504 described above with reference to FIG. 5, but oriented and/or located differently as described herein and as indicated in FIG. 10A. The edge 1004a may be used herein to refer to an edge of the aperture portion 1002a and/or an edge of the elongated aperture stop 1000a.

FIG. 10B shows an elongated aperture stop 1000b that may be defined by an aperture portion 1002b. In various examples, the elongated aperture stop 1000b may be shaped like the elongated aperture stop 1000a described above with reference to FIG. 10A. The aperture portion 1002b may include a gradation portion 1004b along an edge of the elongated aperture stop 1000b. The gradation portion 1004b may be configured to avoid or otherwise limit diffraction of light at the edge of the elongated aperture stop 1000b, which may improve MTF over low-to-middle frequencies by apodization. Additionally, or alternatively, the gradation portion 1004b may be configured to avoid or otherwise limit stray light issues that may arise from light being reflected off of one or more portions of the edge of the elongated aperture stop 1000b. In some embodiments, such stray light may otherwise (e.g., without the gradation portion 1004b) cause light to gather in particular portion(s) of an image sensor, which may result in undesirable optical aberrations in images captured via the image sensor. According to various examples, the gradation portion 1004b may comprise a variation along the edge of the elongated aperture stop 1000b. For example, the gradation portion 1004b may comprise a variation in the shape of the edge, a variation in an amount of light transmission allowed by the gradation 1004b between the rest of the aperture portion 1002b (surrounding the gradation portion 1004b) and the elongated aperture stop 1000b, etc. While the elongated aperture stop 1000b and the aperture portion 1002b as shown in FIG. 10B as extending along the X-Y plane, the elongated aperture stop 1000b and the aperture portion 1002b may extend along the Y-Z plane (or another plane). In various embodiments, the gradation portion 1004b may extend along one or more portions of the edge of the elongated aperture stop 1000b. For example, FIG. 10B indicates that the gradation portion 1004b extends along the long sides (e.g., in the Y-axis direction) of the edge. In other embodiments, however, the gradation portion 1004b may extend along other portion(s) of the edge, or the gradation portion 1004b may extend such that it completely encompasses the edge.

Figure 11:
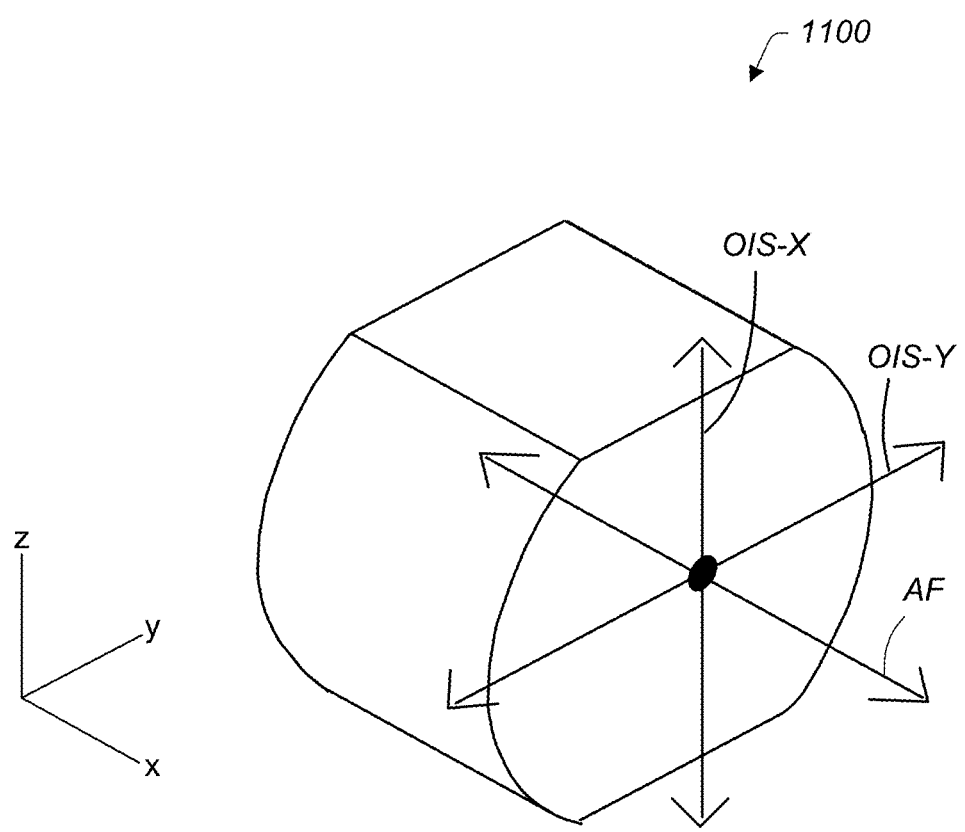
FIG. 11 illustrates an example of 3-axis movement of a lens group within a folded optics arrangement (e.g., a folded optics arrangement of a camera that includes an elongated aperture stop), in accordance with some embodiments.

According to some embodiments, one or more components of the folded optics arrangements described herein may be moved using one or more actuators. FIG. 11 illustrates a non-limiting example of 3-axis movement of a lens group 1100 (e.g., similar to lens group 102 in FIGS. 1A-1B, lens group 204 in FIG. 2, and/or lens group 604 in FIG. 6) within a folded optics arrangement (e.g., a folded optics arrangement that includes an elongated aperture stop). The lens group 1100 may be coupled with an actuator structure that is configured to move the lens group 1100 along multiple axes, e.g., to provide autofocus (AF) and/or optical image stabilization (OIS) functionality. For example, the lens group 1100 may be shifted (e.g., by an actuator) along the X-axis to provide AF movement. Additionally, or alternatively, the lens group 1100 may be shifted along the Z-axis to provide OIS-X movement (e.g., movement that shifts the image projected on the image sensor in one or more directions parallel to the X-axis). Additionally, or alternatively, the lens group 1100 may be shifted along the Y-axis to provide OIS-Y movement (e.g., movement that shifts the image projected on the image sensor in one or more directions parallel to the Y-axis).

Figure 12A:
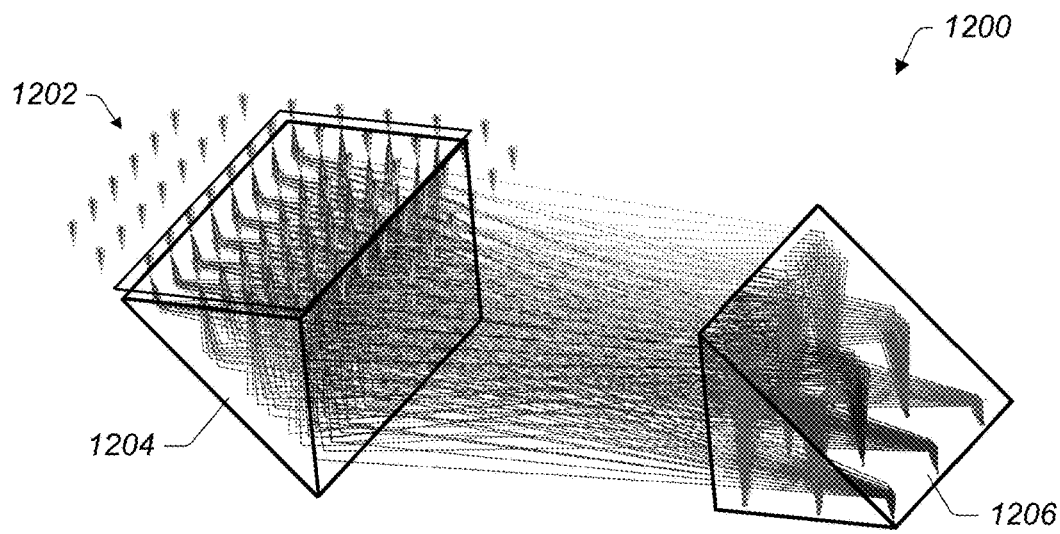
FIGS. 12A-12C illustrate an example of a light path through a camera that includes a folded optics arrangement and an elongated aperture stop (e.g., a rectangular aperture stop), in accordance with some embodiments.
Figure 12B:
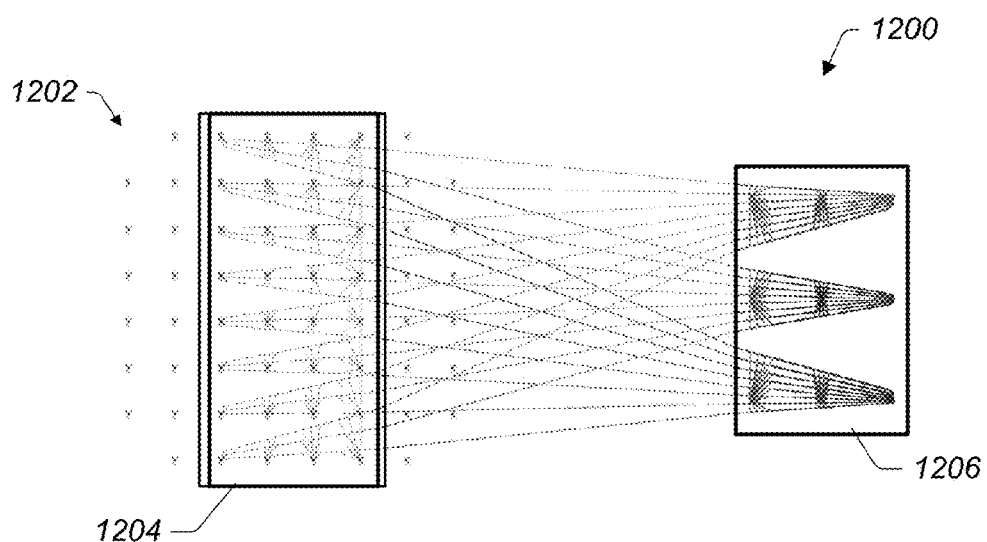
Figure 12C:
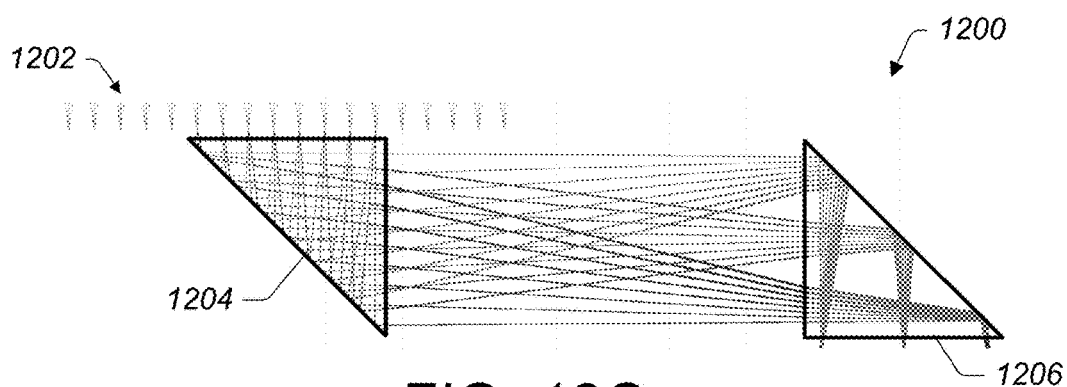

FIGS. 12A-12C illustrate an example 1200 of a light path 1202 through a camera that includes a folded optics arrangement and an elongated aperture stop (e.g., a rectangular aperture stop). FIG. 12A shows a perspective view of the light path 1202 and the prisms (e.g., a first prism 1204 and a second prism 1206) of the folded optics arrangement. FIG. 12B shows a top view of the light path 1202 and the prisms 1204 and 1206. FIG. 12C shows a side view of the light path 1202 and the prisms 1204 and 1206. While not shown in FIGS. 12A-12C, the folded optics arrangement may include a lens group (e.g., lens group 102 in FIGS. 1A-1B, lens group 204 in FIG. 2, lens group 604 in FIG. 6, etc.) between the first prism 1204 and the second prism 1206. In some examples, the light path 1202 indicated in FIGS. 12A-12C may represent an example light path through a camera that includes an elongated aperture stop that is rectangular in shape, such as the aperture stops shown in FIGS. 4, 9A, and 9B.

Figure 13A:
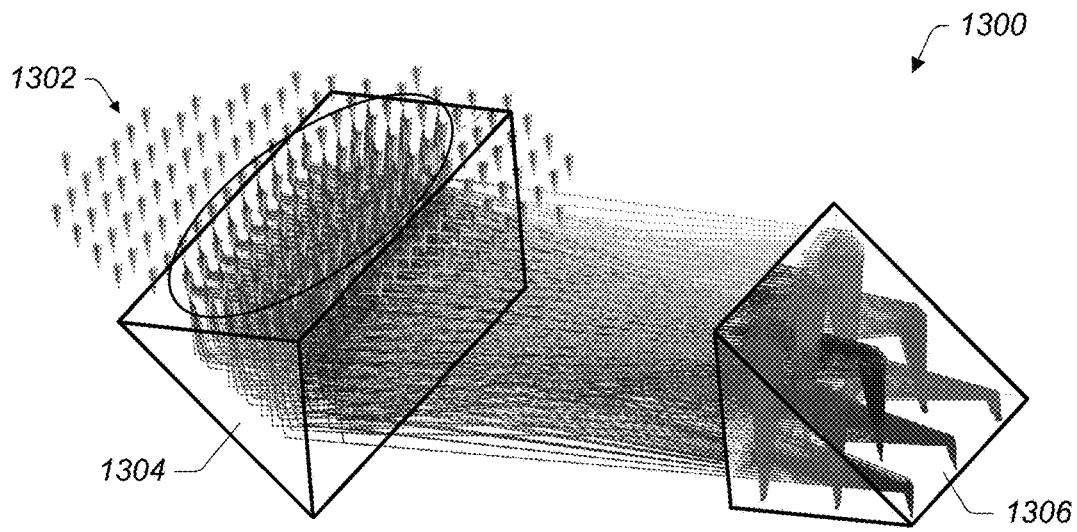
FIGS. 13A-13C illustrate another example of a light path through a camera that includes a folded optics arrangement and an elongated aperture stop (e.g., an oval aperture stop), in accordance with some embodiments.
Figure 13B:
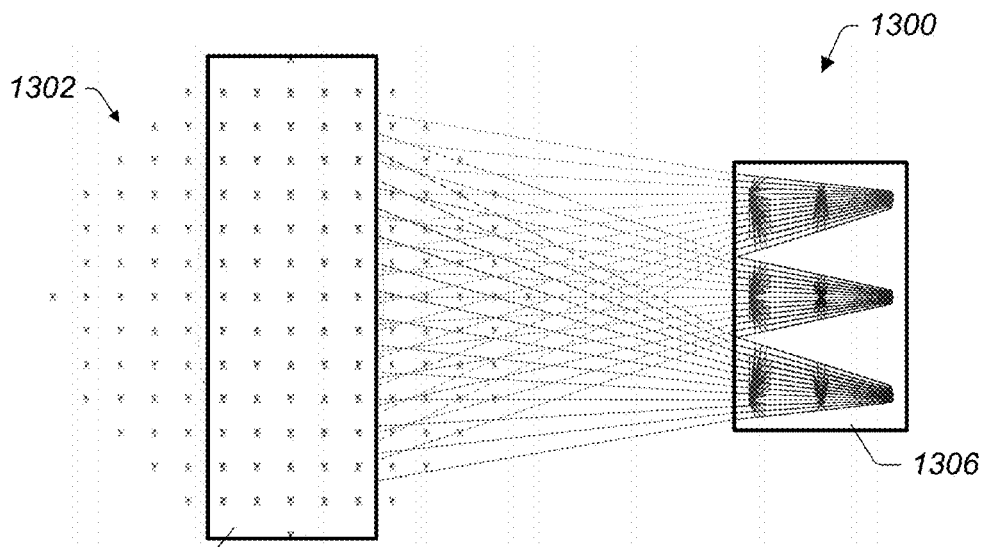
Figure 13C:
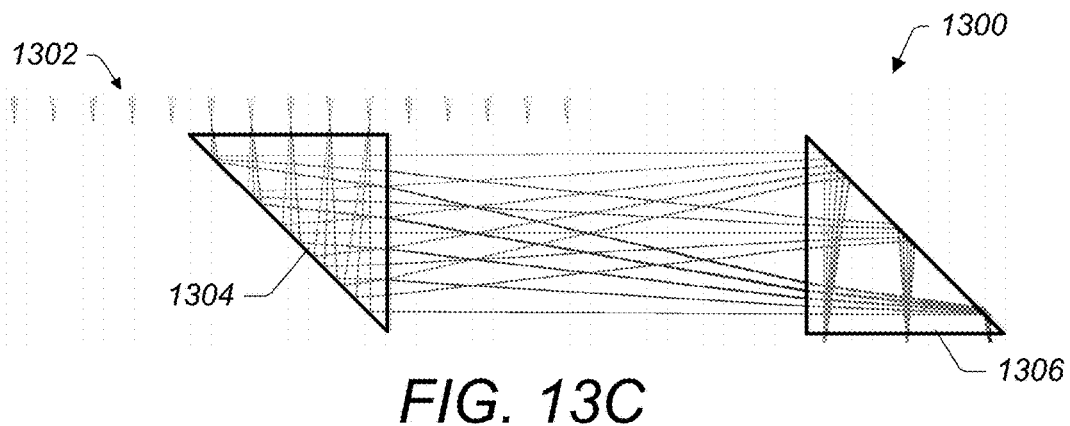

FIGS. 13A-13C illustrate another example of a light path through a camera that includes a folded optics arrangement and an elongated aperture stop (e.g., an oval aperture stop). FIG. 13A shows a perspective view of the light path 1302 and the prisms (e.g., a first prism 1304 and a second prism 1306) of the folded optics arrangement. FIG. 13B shows a top view of the light path 1302 and the prisms 1304 and 1306. FIG. 13C shows a side view of the light path 1302 and the prisms 1304 and 1306. While not shown in FIGS. 13A-13C, the folded optics arrangement may include a lens group (e.g., lens group 102 in FIGS. 1A-1B, lens group 204 in FIG. 2, lens group 604 in FIG. 6, etc.) between the first prism 1304 and the second prism 1306. In some examples, the light path 1302 indicated in FIGS. 13A-13C may represent an example light path through a camera that includes an elongated aperture stop that is oval in shape, such as the aperture stops shown in FIGS. 5, 10A, and 10B.

Figure 14:
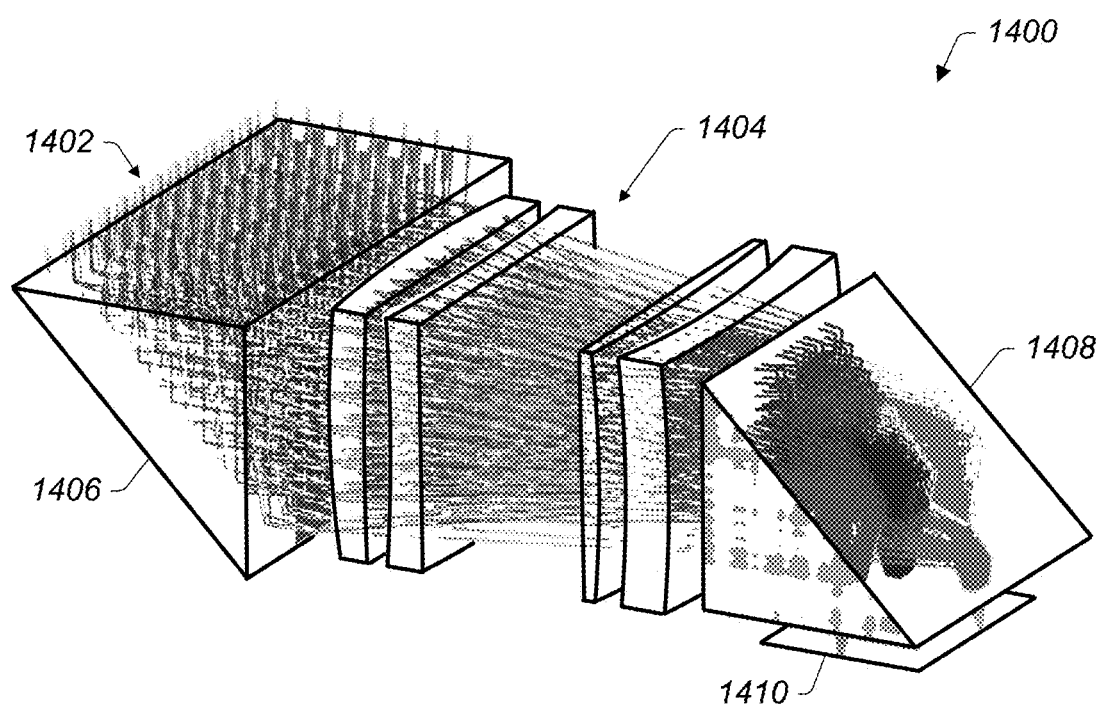
FIG. 14 illustrates an example of a dual-fold light path through a camera that includes a folded optics arrangement and an elongated aperture stop (e.g., a rectangle-ellipse hybrid aperture stop), in accordance with some embodiments.

FIG. 14 illustrates an example of a dual-fold light path 1402 through a camera 1400 that includes a folded optics arrangement and an elongated aperture stop. The folded optics arrangement may include a lens group 1404 between a first prism 1406 and a second prism 1408. In some embodiments, the lens group 1404 may include one or more truncated lens elements. Furthermore, the camera 1400 may include an image sensor 1410. In some examples, the light path 1402 may represent an example light path through a camera that includes an elongated aperture stop that is shaped as a rectangle-ellipse hybrid, such as the aperture stops shown in FIGS. 3, 8A, and 8B.

FIG. 15 illustrates an example of a single-fold light path 1502 through a camera 1500 that includes a folded optics arrangement and an elongated aperture stop. The folded optics arrangement may include a lens group 1504 between a prism 1506 and an image sensor 1508. The image sensor may be orthogonal to an optical axis defined by the lens group 1504. In some embodiments, the lens group 1504 may include one or more truncated lens elements. In some examples, the light path 1502 may represent an example light path through a camera that includes an elongated aperture stop that is shaped as a rectangle-ellipse hybrid, such as the aperture stops shown in FIGS. 3, 8A, and 8B.

Multifunction Device Examples

Embodiments of electronic devices, user interfaces for such devices, and associated processes for using such devices are described. In some embodiments, the device is a portable communications device, such as a mobile telephone, that also contains other functions, such as PDA and/or music player functions. Example embodiments of portable multifunction devices include, without limitation, the iPhone®, iPod Touch®, and iPad® devices from Apple Inc. of Cupertino, California Other portable electronic devices, such as laptops, cameras, cell phones, or tablet computers, may also be used. It should also be understood that, in some embodiments, the device is not a portable communications device, but is a desktop computer with a camera. In some embodiments, the device is a gaming computer with orientation sensors (e.g., orientation sensors in a gaming controller). In other embodiments, the device is not a portable communications device, but is a camera.

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Figure 16:
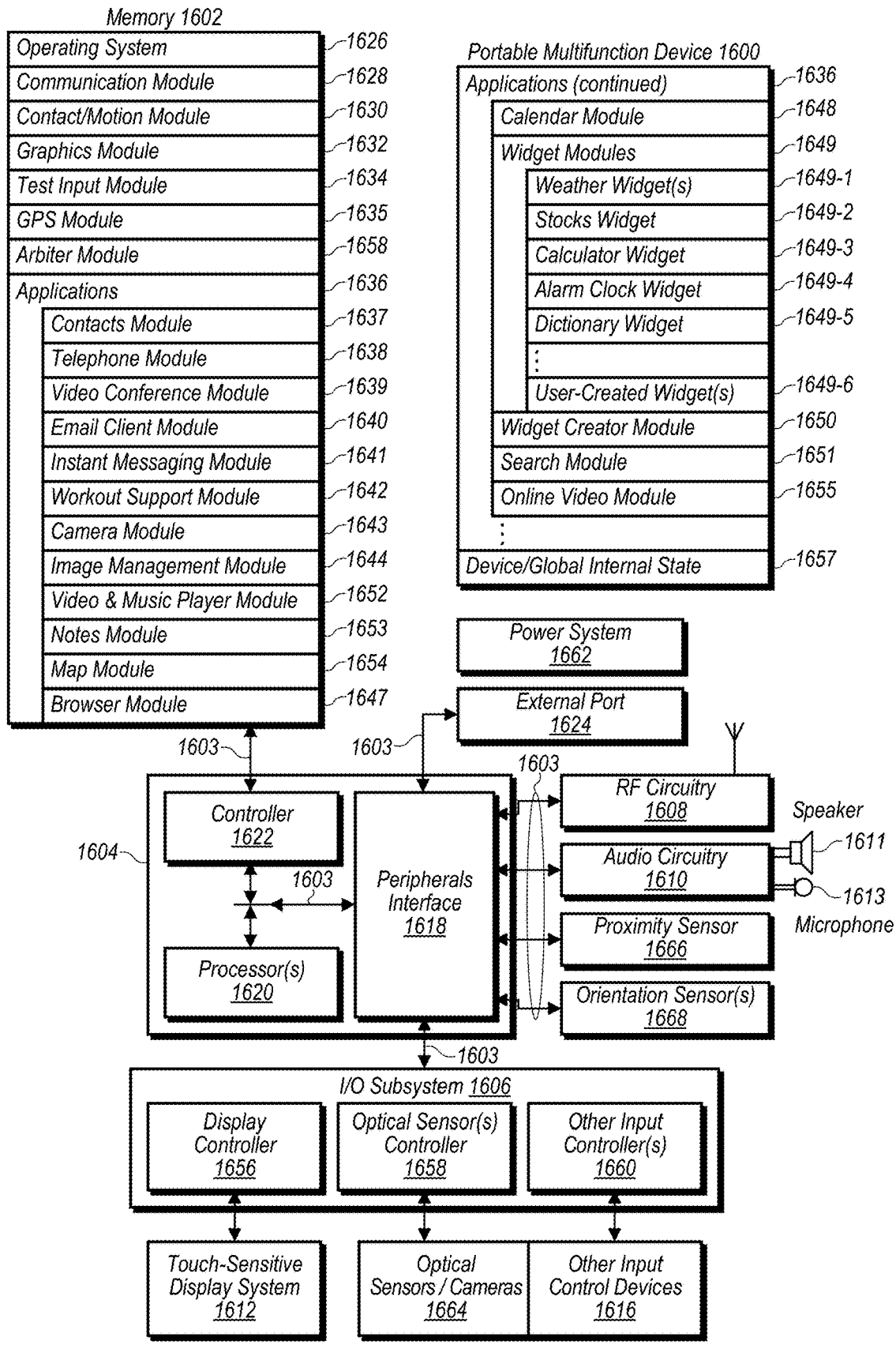
FIG. 16 illustrates a block diagram of an example portable multifunction device that may include a camera having a folded optics arrangement (e.g., a folded optics arrangement of a camera that includes an elongated aperture stop), in accordance with some embodiments.

Attention is now directed toward embodiments of portable devices with cameras. FIG. 16 illustrates a block diagram of an example portable multifunction device 1600 that may include one or more cameras (e.g., the cameras described above with reference to FIGS. 1A-15), in accordance with some embodiments. Cameras 1664 are sometimes called "optical sensors" for convenience, and may also be known as or called an optical sensor system. Device 1600 may include memory 1602 (which may include one or more computer readable storage mediums), memory controller 1622, one or more processing units (CPUs) 1620, peripherals interface 1618, RF circuitry 1608, audio circuitry 1610, speaker 1611, touch-sensitive display system 1612, microphone 1613, input/output (I/O) subsystem 1606, other input or control devices 1616, and external port 1624. Device 1600 may include multiple optical sensors 1664. These components may communicate over one or more communication buses or signal lines 1603.

It should be appreciated that device 1600 is only one example of a portable multifunction device, and that device 1600 may have more or fewer components than shown, may combine two or more components, or may have a different configuration or arrangement of the components. The various components shown in FIG. 16 may be implemented in hardware, software, or a combination of hardware and software, including one or more signal processing and/or application specific integrated circuits.

Memory 1602 may include high-speed random access memory and may also include non-volatile memory, such as one or more magnetic disk storage devices, flash memory devices, or other non-volatile solid-state memory devices. Access to memory 1602 by other components of device 1600, such as CPU 1620 and the peripherals interface 1618, may be controlled by memory controller 1622.

Peripherals interface 1618 can be used to couple input and output peripherals of the device to CPU 1620 and memory 1602. The one or more processors 1620 run or execute various software programs and/or sets of instructions stored in memory 1602 to perform various functions for device 1600 and to process data.

In some embodiments, peripherals interface 1618, CPU 1620, and memory controller 1622 may be implemented on a single chip, such as chip 1604. In some other embodiments, they may be implemented on separate chips.

RF (radio frequency) circuitry 1608 receives and sends RF signals, also called electromagnetic signals. RF circuitry 1608 converts electrical signals to/from electromagnetic signals and communicates with communications networks and other communications devices via the electromagnetic signals. RF circuitry 1608 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 1608 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 1610, speaker 1611, and microphone 1613 provide an audio interface between a user and device 1600. Audio circuitry 1610 receives audio data from peripherals interface 1618, converts the audio data to an electrical signal, and transmits the electrical signal to speaker 1611. Speaker 1611 converts the electrical signal to human-audible sound waves. Audio circuitry 1610 also receives electrical signals converted by microphone 1613 from sound waves. Audio circuitry 1610 converts the electrical signal to audio data and transmits the audio data to peripherals interface 1618 for processing. Audio data may be retrieved from and/or transmitted to memory 1602 and/or RF circuitry 1608 by peripherals interface 1618. In some embodiments, audio circuitry 1610 also includes a headset jack (e.g., 1712, FIG. 17). The headset jack provides an interface between audio circuitry 1610 and removable audio input/output peripherals, such as output-only headphones or a headset with both output (e.g., a headphone for one or both ears) and input (e.g., a microphone).

I/O subsystem 1606 couples input/output peripherals on device 1600, such as touch screen 1612 and other input control devices 1616, to peripherals interface 1618. I/O subsystem 1606 may include display controller 1656 and one or more input controllers 1660 for other input or control devices. The one or more input controllers 1660 receive/send electrical signals from/to other input or control devices 1616. The other input control devices 1616 may include physical buttons (e.g., push buttons, rocker buttons, etc.), dials, slider switches, joysticks, click wheels, and so forth. In some alternate embodiments, input controller(s) 1660 may be coupled to any (or none) of the following: a keyboard, infrared port, USB port, and a pointer device such as a mouse. The one or more buttons (e.g., 1708, FIG. 17) may include an up/down button for volume control of speaker 1611 and/or microphone 1613. The one or more buttons may include a push button (e.g., 1706, FIG. 17).

Touch-sensitive display 1612 provides an input interface and an output interface between the device and a user.

Display controller 1656 receives and/or sends electrical signals from/to touch screen 1612. Touch screen 1612 displays visual output to the user. The visual output may include graphics, text, icons, video, and any combination thereof (collectively termed "graphics"). In some embodiments, some or all of the visual output may correspond to user-interface objects.

Touch screen 1612 has a touch-sensitive surface, sensor or set of sensors that accepts input from the user based on haptic and/or tactile contact. Touch screen 1612 and display controller 1656 (along with any associated modules and/or sets of instructions in memory 1602) detect contact (and any movement or breaking of the contact) on touch screen 1612 and converts the detected contact into interaction with user-interface objects (e.g., one or more soft keys, icons, web pages or images) that are displayed on touch screen 1612. In an example embodiment, a point of contact between touch screen 1612 and the user corresponds to a finger of the user.

Touch screen 1612 may use LCD (liquid crystal display) technology, LPD (light emitting polymer display) technology, or LED (light emitting diode) technology, although other display technologies may be used in other embodiments. Touch screen 1612 and display controller 1656 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 1612. In an example embodiment, projected mutual capacitance sensing technology is used, such as that found in the iPhone®, iPod Touch®, and iPad® from Apple Inc. of Cupertino, California.

Touch screen 1612 may have a video resolution in excess of 800 dpi. In some embodiments, the touch screen has a video resolution of approximately 860 dpi. The user may make contact with touch screen 1612 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 1600 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 1612 or an extension of the touch-sensitive surface formed by the touch screen.

Device 1600 also includes power system 1662 for powering the various components. Power system 1662 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 1600 may also include one or more optical sensors or cameras 1664. FIG. 16 shows an optical sensor 1664 coupled to optical sensor controller 1658 in I/O subsystem 1606. Optical sensor 1664 may include charge-coupled device (CCD) or complementary metal-oxide semiconductor (CMOS) phototransistors. Optical sensor 1664 receives light from the environment, projected through one or more lens, and converts the light to data representing an image. In conjunction with imaging module 1643 (also called a camera module), optical sensor 1664 may capture still images or video. In some embodiments, an optical sensor 1664 is located on the back of device 1600, opposite touch screen display 1612 on the front of the device, so that the touch screen display 1612 may be used as a viewfinder for still and/or video image acquisition. In some embodiments, another optical sensor is located on the front of the device so that the user's image may be obtained for videoconferencing while the user views the other video conference participants on the touch screen display.

Device 1600 may also include one or more proximity sensors 1666. FIG. 16 shows proximity sensor 1666 coupled to peripherals interface 1618. Alternately, proximity sensor 1666 may be coupled to input controller 1660 in I/O subsystem 1606. In some embodiments, the proximity sensor 1666 turns off and disables touch screen 1612 when the multifunction device 1600 is placed near the user's ear (e.g., when the user is making a phone call).

Device 1600 includes one or more orientation sensors 1668. In some embodiments, the one or more orientation sensors 1668 include one or more accelerometers (e.g., one or more linear accelerometers and/or one or more rotational accelerometers). In some embodiments, the one or more orientation sensors 1668 include one or more gyroscopes. In some embodiments, the one or more orientation sensors 1668 include one or more magnetometers. In some embodiments, the one or more orientation sensors 1668 include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 1600. In some embodiments, the one or more orientation sensors 1668 include any combination of orientation/rotation sensors. FIG. 16 shows the one or more orientation sensors 1668 coupled to peripherals interface 1618. Alternately, the one or more orientation sensors 1668 may be coupled to an input controller 1660 in I/O subsystem 1606. In some embodiments, information is displayed on the touch screen display 1612 in a portrait view or a landscape view based on an analysis of data received from the one or more orientation sensors 1668.

In some embodiments, the software components stored in memory 1602 include operating system 1626, communication module (or set of instructions) 1628, contact/motion module (or set of instructions) 1630, graphics module (or set of instructions) 1632, text input module (or set of instructions) 1634, Global Positioning System (GPS) module (or set of instructions) 1635, arbiter module 1658 and applications (or sets of instructions) 1636. Furthermore, in some embodiments memory 1602 stores device/global internal state 1657. Device/global internal state 1657 includes one or more of: active application state, indicating which applications, if any, are currently active; display state, indicating what applications, views or other information occupy various regions of touch screen display 1612; sensor state, including information obtained from the device's various sensors and input control devices 1616; and location information concerning the device's location and/or attitude.

Operating system 1626 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 1628 facilitates communication with other devices over one or more external ports 1624 and also includes various software components for handling data received by RF circuitry 1608 and/or external port 1624. External port 1624 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector.

Contact/motion module 1630 may detect contact with touch screen 1612 (in conjunction with display controller 1656) and other touch sensitive devices (e.g., a touchpad or physical click wheel). Contact/motion module 1630 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 1630 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 1630 and display controller 1656 detect contact on a touchpad.

Contact/motion module 1630 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 1632 includes various known software components for rendering and displaying graphics on touch screen 1612 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 1632 stores data representing graphics to be used. Each graphic may be assigned a corresponding code. Graphics module 1632 receives, from applications etc., one or more codes specifying graphics to be displayed along with, if necessary, coordinate data and other graphic property data, and then generates screen image data to output to display controller 1656.

Text input module 1634, which may be a component of graphics module 1632, provides soft keyboards for entering text in various applications (e.g., contacts 1637, e-mail 1640, IM 1641, browser 1647, and any other application that needs text input).

GPS module 1635 determines the location of the device and provides this information for use in various applications (e.g., to telephone 1638 for use in location-based dialing, to camera 1643 as picture/video metadata, and to applications that provide location-based services such as weather widgets, local yellow page widgets, and map/navigation widgets).

Applications 1636 may include the following modules (or sets of instructions), or a subset or superset thereof:
- contacts module 1637 (sometimes called an address book or contact list);
- telephone module 1638;
- video conferencing module 1639;
- e-mail client module 1640;
- instant messaging (IM) module 1641;
- workout support module 1642;
- camera module 1643 for still and/or video images;
- image management module 1644;
- browser module 1647;
- calendar module 1648;
- widget modules 1649, which may include one or more of: weather widget 1649-1, stocks widget 1649-2, calculator widget 1649-3, alarm clock widget 1649-4, dictionary widget 1649-5, and other widgets obtained by the user, as well as user-created widgets 1649-6;
- widget creator module 1650 for making user-created widgets 1649-6;
- search module 1651;
- video and music player module 1652, which may be made up of a video player module and a music player module;
- notes module 1653;
- map module 1654; and/or
- online video module 1655.

Examples of other applications 1636 that may be stored in memory 1602 include other word processing applications, other image editing applications, drawing applications, presentation applications, JAVA-enabled applications, encryption, digital rights management, voice recognition, and voice replication.

In conjunction with touch screen 1612, display controller 1656, contact module 1630, graphics module 1632, and text input module 1634, contacts module 1637 may be used to manage an address book or contact list (e.g., stored in application internal state 1657), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 1638, video conference 1639, e-mail 1640, or IM 1641; and so forth.

In conjunction with RF circuitry 1608, audio circuitry 1610, speaker 1611, microphone 1613, touch screen 1612, display controller 1656, contact module 1630, graphics module 1632, and text input module 1634, telephone module 1638 may be used to enter a sequence of characters corresponding to a telephone number, access one or more telephone numbers in address book 1637, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 1608, audio circuitry 1610, speaker 1611, microphone 1613, touch screen 1612, display controller 1656, optical sensor 1664, optical sensor controller 1658, contact module 1630, graphics module 1632, text input module 1634, contact list 1637, and telephone module 1638, videoconferencing module 1639 includes executable instructions to initiate, conduct, and terminate a video conference between a user and one or more other participants in accordance with user instructions.

In conjunction with RF circuitry 1608, touch screen 1612, display controller 1656, contact module 1630, graphics module 1632, and text input module 1634, e-mail client module 1640 includes executable instructions to create, send, receive, and manage e-mail in response to user instructions. In conjunction with image management module 1644, e-mail client module 1640 makes it very easy to create and send e-mails with still or video images taken with camera module 1643.

In conjunction with RF circuitry 1608, touch screen 1612, display controller 1656, contact module 1630, graphics module 1632, and text input module 1634, the instant messaging module 1641 includes executable instructions to enter a sequence of characters corresponding to an instant message, to modify previously entered characters, to transmit a respective instant message (for example, using a Short Message Service (SMS) or Multimedia Message Service (MIMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 1608, touch screen 1612, display controller 1656, contact module 1630, graphics module 1632, text input module 1634, GPS module 1635, map module 1654, and music player module 1646, workout support module 1642 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 1612, display controller 1656, optical sensor(s) 1664, optical sensor controller 1658, contact module 1630, graphics module 1632, and image management module 1644, camera module 1643 includes executable instructions to capture still images or video (including a video stream) and store them into memory 1602, modify characteristics of a still image or video, or delete a still image or video from memory 1602.

In conjunction with touch screen 1612, display controller 1656, contact module 1630, graphics module 1632, text input module 1634, and camera module 1643, image management module 1644 includes executable instructions to arrange, modify (e.g., edit), or otherwise manipulate, label, delete, present (e.g., in a digital slide show or album), and store still and/or video images.

In conjunction with RF circuitry 1608, touch screen 1612, display system controller 1656, contact module 1630, graphics module 1632, and text input module 1634, browser module 1647 includes executable instructions to browse the Internet in accordance with user instructions, including searching, linking to, receiving, and displaying web pages or portions thereof, as well as attachments and other files linked to web pages.

In conjunction with RF circuitry 1608, touch screen 1612, display system controller 1656, contact module 1630, graphics module 1632, text input module 1634, e-mail client module 1640, and browser module 1647, calendar module 1648 includes executable instructions to create, display, modify, and store calendars and data associated with calendars (e.g., calendar entries, to do lists, etc.) in accordance with user instructions.

In conjunction with RF circuitry 1608, touch screen 1612, display system controller 1656, contact module 1630, graphics module 1632, text input module 1634, and browser module 1647, widget modules 1649 are mini-applications that may be downloaded and used by a user (e.g., weather widget 549-1, stocks widget 549-2, calculator widget 1649-3, alarm clock widget 1649-4, and dictionary widget 1649-5) or created by the user (e.g., user-created widget 1649-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 1608, touch screen 1612, display system controller 1656, contact module 1630, graphics module 1632, text input module 1634, and browser module 1647, the widget creator module 1650 may be used by a user to create widgets (e.g., turning a user-specified portion of a web page into a widget).

In conjunction with touch screen 1612, display system controller 1656, contact module 1630, graphics module 1632, and text input module 1634, search module 1651 includes executable instructions to search for text, music, sound, image, video, and/or other files in memory 1602 that match one or more search criteria (e.g., one or more user-specified search terms) in accordance with user instructions.

In conjunction with touch screen 1612, display system controller 1656, contact module 1630, graphics module 1632, audio circuitry 1610, speaker 1611, RF circuitry 1608, and browser module 1647, video and music player module 1652 includes executable instructions that allow the user to download and play back recorded music and other sound files stored in one or more file formats, such as MP3 or AAC files, and executable instructions to display, present or otherwise play back videos (e.g., on touch screen 1612 or on an external, connected display via external port 1624). In some embodiments, device 1600 may include the functionality of an MP3 player.

In conjunction with touch screen 1612, display controller 1656, contact module 1630, graphics module 1632, and text input module 1634, notes module 1653 includes executable instructions to create and manage notes, to do lists, and the like in accordance with user instructions.

In conjunction with RF circuitry 1608, touch screen 1612, display system controller 1656, contact module 1630, graphics module 1632, text input module 1634, GPS module 1635, and browser module 1647, map module 1654 may be used to receive, display, modify, and store maps and data associated with maps (e.g., driving directions; data on stores and other points of interest at or near a particular location; and other location-based data) in accordance with user instructions.

In conjunction with touch screen 1612, display system controller 1656, contact module 1630, graphics module 1632, audio circuitry 1610, speaker 1611, RF circuitry 1608, text input module 1634, e-mail client module 1640, and browser module 1647, online video module 1655 includes instructions that allow the user to access, browse, receive (e.g., by streaming and/or download), play back (e.g., on the touch screen or on an external, connected display via external port 1624), send an e-mail with a link to a particular online video, and otherwise manage online videos in one or more file formats, such as H.264. In some embodiments, instant messaging module 1641, rather than e-mail client module 1640, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise rearranged in various embodiments. In some embodiments, memory 1602 may store a subset of the modules and data structures identified above. Furthermore, memory 1602 may store additional modules and data structures not described above.

In some embodiments, device 1600 is a device where operation of a predefined set of functions on the device is performed exclusively through a touch screen and/or a touchpad. By using a touch screen and/or a touchpad as the primary input control device for operation of device 1600, the number of physical input control devices (such as push buttons, dials, and the like) on device 1600 may be reduced.

The predefined set of functions that may be performed exclusively through a touch screen and/or a touchpad include navigation between user interfaces. In some embodiments, the touchpad, when touched by the user, navigates device 1600 to a main, home, or root menu from any user interface that may be displayed on device 1600. In such embodiments, the touchpad may be referred to as a "menu button." In some other embodiments, the menu button may be a physical push button or other physical input control device instead of a touchpad.

Figure 17:
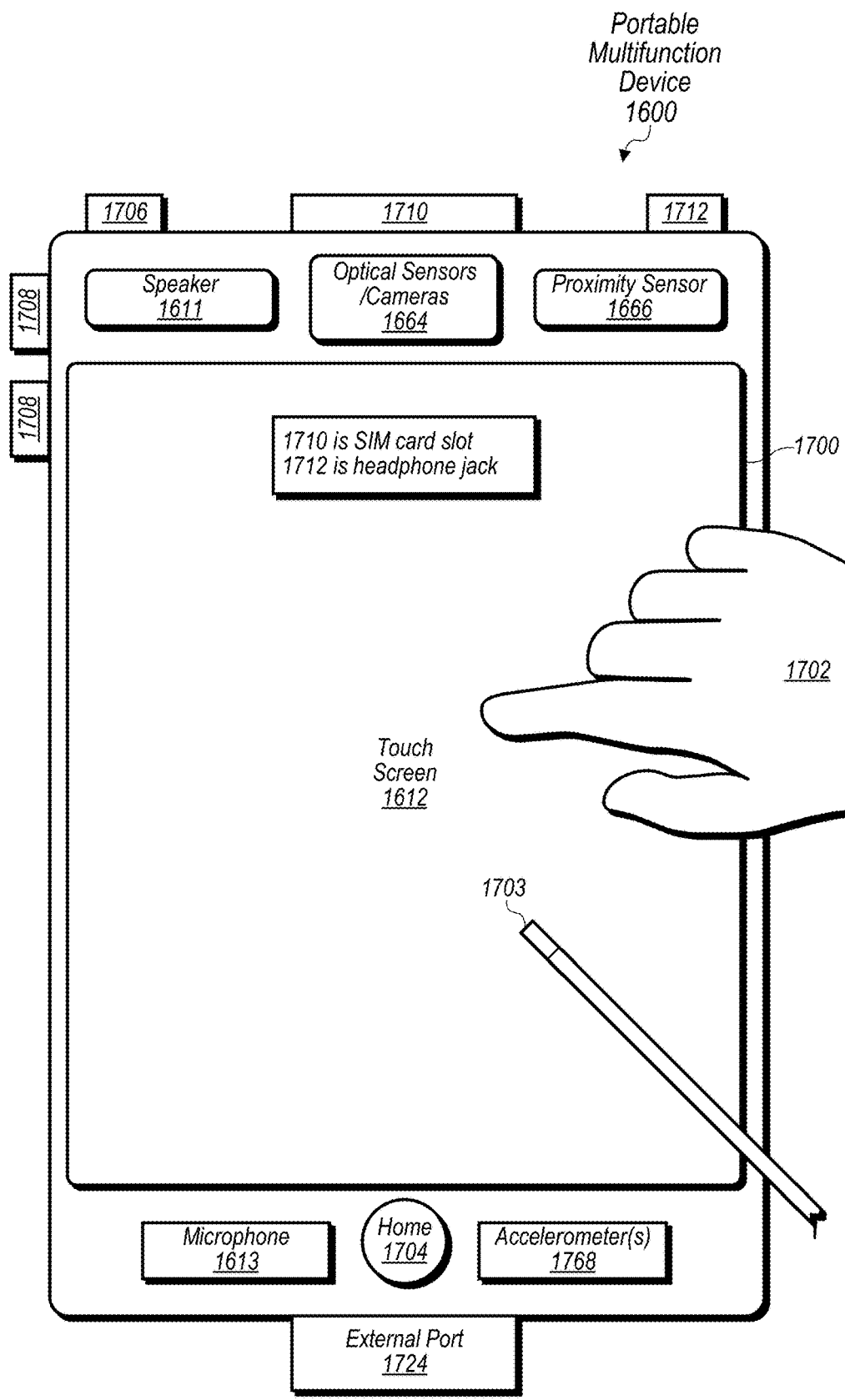
FIG. 17 depicts an example portable multifunction device that may include a camera having a folded optics arrangement (e.g., a folded optics arrangement of a camera that includes an elongated aperture stop), in accordance with some embodiments.

FIG. 17 depicts illustrates an example portable multifunction device 1600 that may include one or more cameras (e.g., the cameras described above with reference to FIGS. 1A-15), in accordance with some embodiments. The device 1600 may have a touch screen 1612. The touch screen 1612 may display one or more graphics within user interface (UI) 1700. In this embodiment, as well as others described below, a user may select one or more of the graphics by making a gesture on the graphics, for example, with one or more fingers 1702 (not drawn to scale in the figure) or one or more styluses 1703 (not drawn to scale in the figure).

Device 1600 may also include one or more physical buttons, such as "home" or menu button 1704. As described previously, menu button 1704 may be used to navigate to any application 1636 in a set of applications that may be executed on device 1600. Alternatively, in some embodiments, the menu button 1704 is implemented as a soft key in a GUI displayed on touch screen 1612.

In one embodiment, device 1600 includes touch screen 1612, menu button 1704, push button 1706 for powering the device on/off and locking the device, volume adjustment button(s) 1708, Subscriber Identity Module (SIM) card slot 1710, head set jack 1712, and docking/charging external port 1724. Push button 1706 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 1600 also may accept verbal input for activation or deactivation of some functions through microphone 1613.

It should be noted that, although many of the examples herein are given with reference to optical sensor(s)/camera(s) 1664 (on the front of a device), one or more rear-facing cameras or optical sensors that are pointed opposite from the display may be used instead of, or in addition to, an optical sensor(s)/camera(s) 1664 on the front of a device.

Example Computer System

Figure 18:
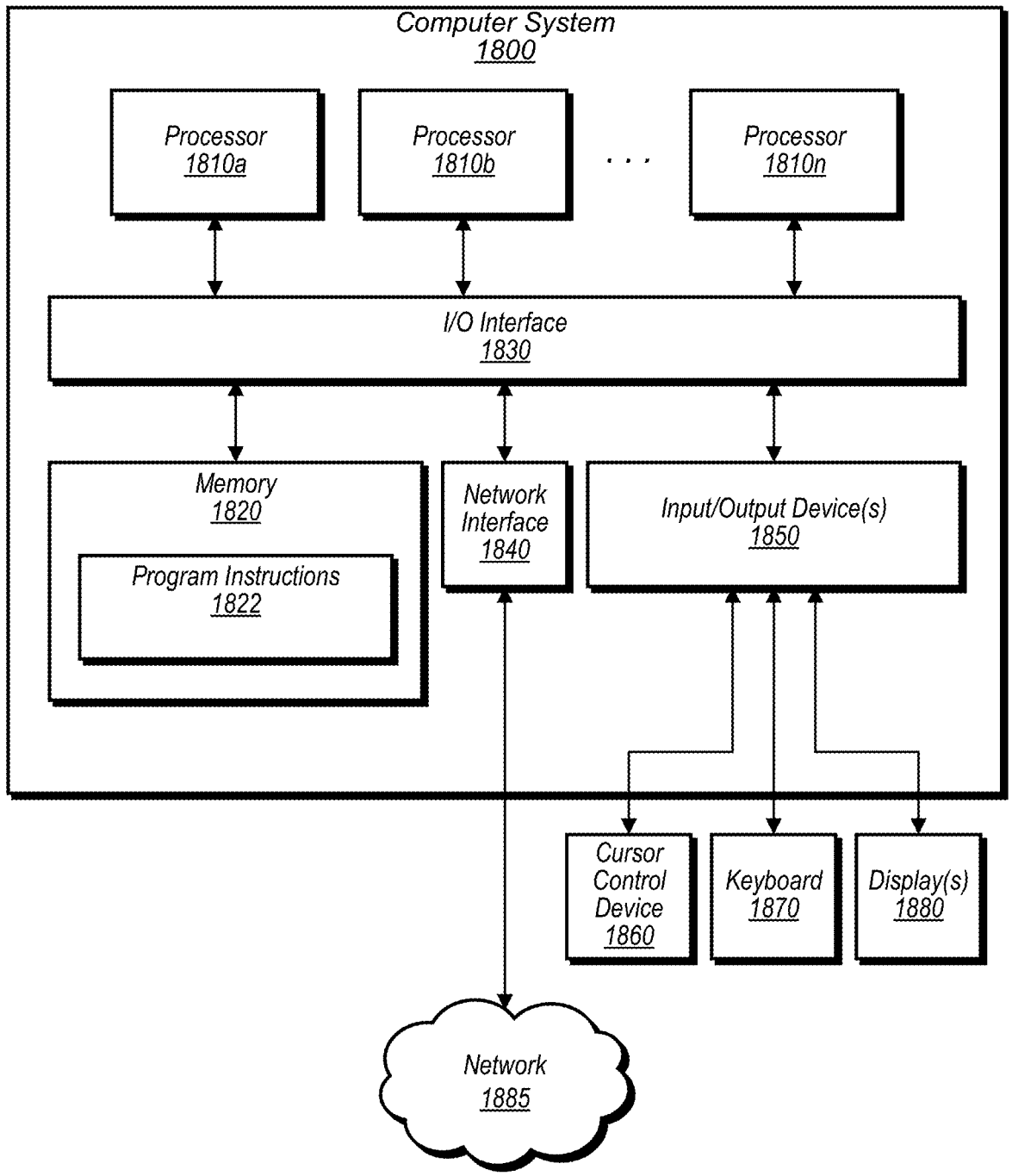
FIG. 18 illustrates an example computer system that may include a camera having a folded optics arrangement (e.g., a folded optics arrangement of a camera that includes an elongated aperture stop), in accordance with some embodiments.

FIG. 18 illustrates an example computer system 1800 that may include one or more cameras (e.g., the cameras described above with reference to FIGS. 1A-15), according to some embodiments. The computer system 1800 may be configured to execute any or all of the embodiments described above. In different embodiments, computer system 1800 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device.

Various embodiments of a camera motion control system as described herein, including embodiments of magnetic position sensing, as described herein may be executed in one or more computer systems 1800, which may interact with various other devices. Note that any component, action, or functionality described above with respect to FIGS. 1-17 may be implemented on one or more computers configured as computer system 1800 of FIG. 18, according to various embodiments. In the illustrated embodiment, computer system 1800 includes one or more processors 1810 coupled to a system memory 1820 via an input/output (I/O) interface 1830. Computer system 1800 further includes a network interface 1840 coupled to I/O interface 1830, and one or more input/output devices 1850, such as cursor control device 1860, keyboard 1870, and display(s) 1880. In some cases, it is contemplated that embodiments may be implemented using a single instance of computer system 1800, while in other embodiments multiple such systems, or multiple nodes making up computer system 1800, may be configured to host different portions or instances of embodiments. For example, in one embodiment some elements may be implemented via one or more nodes of computer system 1800 that are distinct from those nodes implementing other elements.

In various embodiments, computer system 1800 may be a uniprocessor system including one processor 1810, or a multiprocessor system including several processors 1810 (e.g., two, four, eight, or another suitable number). Processors 1810 may be any suitable processor capable of executing instructions. For example, in various embodiments processors 1810 may be general-purpose or embedded processors implementing any of a variety of instruction set architectures (ISAs), such as the x86, PowerPC, SPARC, or MIPS ISAs, or any other suitable ISA. In multiprocessor systems, each of processors 1810 may commonly, but not necessarily, implement the same ISA.

System memory 1820 may be configured to store camera control program instructions 1822 and/or camera control data accessible by processor 1810. In various embodiments, system memory 1820 may be implemented using any suitable memory technology, such as static random access memory (SRAM), synchronous dynamic RAM (SDRAM), nonvolatile/Flash-type memory, or any other type of memory. In the illustrated embodiment, program instructions 1822 may be configured to implement a lens control application 1824 incorporating any of the functionality described above. Additionally, existing camera control data 1832 of memory 1820 may include any of the information or data structures described above. In some embodiments, program instructions and/or data may be received, sent or stored upon different types of computer-accessible media or on similar media separate from system memory 1820 or computer system 1800. While computer system 1800 is described as implementing the functionality of functional blocks of previous Figures, any of the functionality described herein may be implemented via such a computer system.

In one embodiment, I/O interface 1830 may be configured to coordinate I/O traffic between processor 1810, system memory 1820, and any peripheral devices in the device, including network interface 1840 or other peripheral interfaces, such as input/output devices 1850. In some embodiments, I/O interface 1830 may perform any necessary protocol, timing or other data transformations to convert data signals from one component (e.g., system memory 1820) into a format suitable for use by another component (e.g., processor 1810). In some embodiments, I/O interface 1830 may include support for devices attached through various types of peripheral buses, such as a variant of the Peripheral Component Interconnect (PCI) bus standard or the Universal Serial Bus (USB) standard, for example. In some embodiments, the function of I/O interface 1830 may be split into two or more separate components, such as a north bridge and a south bridge, for example. Also, in some embodiments some or all of the functionality of I/O interface 1830, such as an interface to system memory 1820, may be incorporated directly into processor 1810.

Network interface 1840 may be configured to allow data to be exchanged between computer system 1800 and other devices attached to a network 1885 (e.g., carrier or agent devices) or between nodes of computer system 1800. Network 1885 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1840 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1850 may, in some embodiments, include one or more display terminals, keyboards, keypads, touchpads, scanning devices, voice or optical recognition devices, or any other devices suitable for entering or accessing data by one or more computer systems 1800. Multiple input/output devices 1850 may be present in computer system 1800 or may be distributed on various nodes of computer system 1800. In some embodiments, similar input/output devices may be separate from computer system 1800 and may interact with one or more nodes of computer system 1800 through a wired or wireless connection, such as over network interface 1840.

As shown in FIG. 18, memory 1820 may include program instructions 1822, which may be processor-executable to implement any element or action described above. In one embodiment, the program instructions may implement the methods described above. In other embodiments, different elements and data may be included. Note that data may include any data or information described above.

Those skilled in the art will appreciate that computer system 1800 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1800 may be transmitted to computer system 1800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations.

Additional descriptions of embodiments (example clauses):

Clause 1: A camera, comprising: a folded optics arrangement to fold a path of light, the folded optics arrangement comprising: a light path folding element; and a lens group comprising one or more lens elements; an image sensor to capture light that has passed through the folded optics arrangement; and an aperture portion defining an elongated aperture stop that allows the light to pass to at least a portion of the folded optics arrangement.

Clause 2: The camera of Clause 1, wherein the elongated aperture stop has a shortest dimension in a direction that is orthogonal to an optical axis defined by the lens group.

Clause 3: The camera of any of Clauses 1 or 2, wherein the aperture portion is located between the light path folding element and the lens group such that the light is redirected by the light path folding element before the light passes through the elongated aperture stop, and such that the light passes through the elongated aperture stop before the light passes through the lens group.

Clause 4: The camera of Clause 1, wherein the elongated aperture stop has a shortest dimension in a direction that is parallel to an optical axis defined by the lens group.

Clause 5: The camera of any of Clauses 1 or 4, wherein the aperture portion is located proximate the light path folding element such that the light passes through the elongated aperture stop before the light is redirected by the light path folding element.

Clause 6: The camera of any of Clauses 1, 4, or 5, further comprising: an optical element to optically power the light path folding element, wherein the optical element is at least one of: adjacent to a top portion of the light path folding element, or integrated with the top portion of the light path folding element; wherein the aperture portion is located proximate the optical element such that light passes through the elongated aperture stop before the light passes through the optical element.

Clause 7: The camera of any of Clauses 1-6, wherein: the light path folding element is a first light path folding element comprising a first prism or a first mirror; the folded optics arrangement further comprises: a second light path folding element comprising a second prism or a second mirror; the lens group is disposed between the first light path folding element and the second light path folding element; and the image sensor defines a plane that is parallel to an optical axis defined by the lens group.

Clause 8: The camera of any of Clauses 1-7, wherein: the aperture portion comprises a gradation portion along at least a portion of an edge of the elongated aperture stop; and the gradation portion limits diffraction at the portion of the edge of the elongated aperture stop.

Clause 9: The camera of any of Clauses 1-8, wherein the one or more lens elements comprise truncated lens elements.

Clause 10: A device, comprising: one or more processors; memory storing program instructions executable by the one or more processors to control operation of a camera; and the camera, comprising: a folded optics arrangement to fold a path of light, the folded optics arrangement comprising: a light path folding element; and a lens group comprising one or more lens elements; an image sensor to capture light that has passed through the folded optics arrangement; and an aperture portion defining an elongated aperture stop that allows the light to pass to at least a portion of the folded optics arrangement.

Clause 11: The device of Clause 10, wherein the elongated aperture stop has a shortest dimension in a direction that is orthogonal to an optical axis defined by the lens group.

Clause 12: The device of any of Clauses 10 or 11, wherein the aperture portion is located between the light path folding element and the lens group such that the light is redirected by the light path folding element before the light passes through the elongated aperture stop, and such that the light passes through the elongated aperture stop before the light passes through the lens group.

Clause 13: The device of Clause 10, wherein the elongated aperture stop has a shortest dimension in a direction that is parallel to an optical axis defined by the lens group.

Clause 14: The device of any of Clauses 10 or 13, wherein the aperture portion is located proximate the light path folding element such that the light passes through the elongated aperture stop before the light is redirected by the light path folding element.

Clause 15: The device of any of Clauses 10-14, wherein the elongated aperture stop is shaped as at least one of: a rectangle, an oval, or a rectangle-ellipse hybrid.

Clause 16: A folded optics system, comprising: a lens group including one or more lens elements; a light path folding element to redirect light to the lens group; and an aperture portion defining an elongated aperture stop that allows the light to pass to an image sensor.

Clause 17: The folded optics system of Clause 16, wherein the elongated aperture stop has a shortest dimension in a direction that is orthogonal to an optical axis defined by the lens group.

Clause 18: The folded optics system of any of Clauses 16 or 17, wherein the aperture portion is located between the light path folding element and the lens group such that the light is redirected by the light path folding element before the light passes through the elongated aperture stop, and such that the light passes through the elongated aperture stop before the light passes through the lens group.

Clause 19: The folded optics system of Clause 16, wherein the elongated aperture stop has a shortest dimension in a direction that is parallel to an optical axis defined by the lens group.

Clause 20: The folded optics system of any of Clauses 16 or 19, wherein the aperture portion is located proximate the light path folding element such that the light passes through the elongated aperture stop before the light is redirected by the light path folding element.

Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:
1. A camera, comprising:
   a folded optics arrangement configured to fold a path of light, the folded optics arrangement comprising:
      a light path folding element; and
      a lens group comprising one or more lens elements;
   an image sensor configured to capture light that has passed through the folded optics arrangement; and
   an aperture portion defining an elongated aperture stop that allows the light to pass to at least a portion of the folded optics arrangement, wherein:
      the aperture portion comprises a gradation portion along at least a portion of an edge of the elongated aperture stop, and
      the gradation portion limits diffraction at the portion of the edge of the elongated aperture stop.

2. The camera of claim 1, wherein the elongated aperture stop has a shortest dimension in a direction that is orthogonal to an optical axis defined by the lens group.

3. The camera of claim 2, wherein the aperture portion is located between the light path folding element and the lens group such that the light is redirected by the light path folding element before the light passes through the elongated aperture stop, and such that the light passes through the elongated aperture stop before the light passes through the lens group.

4. The camera of claim 1, wherein the elongated aperture stop has a shortest dimension in a direction that is parallel to an optical axis defined by the lens group.

5. The camera of claim 4, wherein the aperture portion is located proximate the light path folding element such that the light passes through the elongated aperture stop before the light is redirected by the light path folding element.

6. The camera of claim 4, further comprising:
an optical element to optically power the light path folding element, wherein the optical element is at least one of: adjacent to a top portion of the light path folding element, or integrated with the top portion of the light path folding element;
wherein the aperture portion is located proximate the optical element such that light passes through the elongated aperture stop before the light passes through the optical element.

7. The camera of claim 1, wherein:
the light path folding element is a first light path folding element comprising a first prism or a first mirror;
the folded optics arrangement further comprises:
a second light path folding element comprising a second prism or a second mirror;
the lens group is disposed between the first light path folding element and the second light path folding element; and
the image sensor defines a plane that is parallel to an optical axis defined by the lens group.

8. The camera of claim 1, wherein the one or more lens elements comprise truncated lens elements.

9. A device, comprising:
one or more processors;
memory storing program instructions executable by the one or more processors to control operation of a camera; and
the camera, comprising:
a folded optics arrangement configured to fold a path of light, the folded optics arrangement comprising:
a light path folding element; and
a lens group comprising one or more lens elements;
an image sensor configured to capture light that has passed through the folded optics arrangement; and
an aperture portion defining an elongated aperture stop that allows the light to pass to at least a portion of the folded optics arrangement, wherein the elongated aperture stop has a shortest dimension in a direction that is parallel to an optical axis defined by the lens group.

10. The device of claim 9, wherein the aperture portion is located proximate the light path folding element such that the light passes through the elongated aperture stop before the light is redirected by the light path folding element.

11. The device of claim 9, wherein the elongated aperture stop is shaped as at least one of: a rectangle, an oval, or a rectangle-ellipse hybrid.

12. The device of claim 9, wherein:
the aperture portion comprises a gradation portion along at least a portion of an edge of the elongated aperture stop; and
the gradation portion limits diffraction at the portion of the edge of the elongated aperture stop.

13. A folded optics system, comprising:
a lens group including one or more lens elements;
light path folding element configured to redirect light in a direction towards the lens group; and
an aperture portion defining an elongated aperture stop that allows the light to pass to an image sensor, wherein the aperture portion is located proximate the light path folding element such that the light passes through the elongated aperture stop before the light is redirected by the light path folding element.

14. The folded optics system of claim 13, wherein the elongated aperture stop has a shortest dimension in a direction that is orthogonal to an optical axis defined by the lens group.

15. The folded optics system of claim 13, wherein the elongated aperture stop has a shortest dimension in a direction that is parallel to an optical axis defined by the lens group.

16. The folded optics system of claim 13, wherein the elongated aperture stop is shaped as at least one of: a rectangle, an oval, or a rectangle-ellipse hybrid.

17. The folded optics system of claim 13, wherein:
the aperture portion comprises a gradation portion along at least a portion of an edge of the elongated aperture stop; and
the gradation portion limits diffraction at the portion of the edge of the elongated aperture stop.

18. The folded optics system of claim 13, wherein the one or more lens elements comprise truncated lens elements.

19. The folded optics system of claim 13, wherein the light path folding element does not have optical power.

* * * * *